US010115300B2

(12) United States Patent
Kim et al.

(10) Patent No.: US 10,115,300 B2
(45) Date of Patent: Oct. 30, 2018

(54) METHOD AND APPARATUS FOR REMOTE CONTROL

(71) Applicant: Samsung Electronics Co., Ltd., Gyeonggi-do (KR)

(72) Inventors: Hark-Sang Kim, Seoul (KR); Yong-Sang Yun, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 7 days.

(21) Appl. No.: 14/969,234

(22) Filed: Dec. 15, 2015

(65) Prior Publication Data

US 2016/0171879 A1 Jun. 16, 2016

(30) Foreign Application Priority Data

Dec. 16, 2014 (KR) ........................ 10-2014-0181534

(51) Int. Cl.

| | |
|---|---|
| ***G05B 11/01*** | (2006.01) |
| ***G08C 17/02*** | (2006.01) |
| ***G08C 23/04*** | (2006.01) |

(52) U.S. Cl.

CPC ............. *G08C 17/02* (2013.01); *G08C 23/04* (2013.01); *G08C 2201/30* (2013.01); *G08C 2201/92* (2013.01)

(58) Field of Classification Search

CPC combination set(s) only.
See application file for complete search history.

(56) References Cited

U.S. PATENT DOCUMENTS

| | | | | |
|---|---|---|---|---|
| 9,024,894 B1 * | 5/2015 | Smith | G06F 3/0488 345/156 |
| 2005/0162282 A1 * | 7/2005 | Dresti | G05B 15/02 340/12.3 |
| 2009/0146834 A1 | 6/2009 | Huang | |
| 2010/0005428 A1 * | 1/2010 | Ikeda | G06F 3/04883 715/863 |
| 2010/0169842 A1 * | 7/2010 | Migos | G06F 3/04883 715/863 |
| 2012/0056823 A1 * | 3/2012 | Skog | G08C 17/02 345/173 |
| 2012/0062471 A1 * | 3/2012 | Poulidis | H04N 5/4403 345/173 |
| 2012/0119889 A1 | 5/2012 | Carrillo et al. | |
| 2013/0043986 A1 | 2/2013 | Pan et al. | |

(Continued)

FOREIGN PATENT DOCUMENTS

| | | |
|---|---|---|
| KR | 2003-0043122 A | 6/2003 |
| KR | 10-2004-0006855 A | 1/2004 |
| KR | 10-2010-0015165 A | 2/2010 |

(Continued)

OTHER PUBLICATIONS

European Search Report dated Apr. 26, 2016.
International Search Report dated Apr. 8, 2016.

*Primary Examiner* — Thomas McCormack
(74) *Attorney, Agent, or Firm* — Cha & Reiter, LLC.

(57) ABSTRACT

A method of an electronic device comprising: determining at least one object; associating at least one control signal with the object; and outputting the control signal corresponding to the object.

20 Claims, 17 Drawing Sheets

(56) References Cited

U.S. PATENT DOCUMENTS

| | | | |
|---|---|---|---|
| 2014/0070926 | A1 | 3/2014 | Shan |
| 2014/0327528 | A1 | 11/2014 | Matsumoto |

FOREIGN PATENT DOCUMENTS

| | | | |
|---|---|---|---|
| KR | 10-1037397 | B1 | 5/2011 |
| KR | 10-2012-0107214 | A | 10/2012 |
| KR | 10-2014-0049437 | A | 4/2014 |
| WO | 01/71685 | A1 | 9/2001 |
| WO | 03/044625 | A2 | 5/2003 |
| WO | 2011/037400 | A2 | 3/2011 |

* cited by examiner 1011 1013 1015 1017 1019 1021

| | Object No. | Shape | Subtitle | Command #1 (Short press) | Command #2 (Long press) | Command #1 (Double Tap) |
|---|---|---|---|---|---|---|
| 1031→ | 1 | 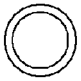 | Power | TV-SAMSUNG-POWER ON/OFF<br>SET-TOP BOX-**-POWER ON/OFF | SET-TOP BOX-**-POWER ON/OFF | TV-SAMSUNG-POWER ON/OFF<br>SET-TOP BOX-**-POWER ON/OFF |
| | 2 | 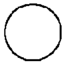 | External input | TV-SAMSUNG-External input mode change | | |
| | 3 | 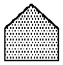 | Channel | SET-TOP BOX-**-Channel + | | |
| | 4 | 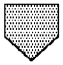 | Channel | SET-TOP BOX-**-Channel - | | |
| 1033→ | 5 |  | Volume | Speaker-SAMSUNG-Volume + | SET-TOP BOX-**-Channel + | |
| | 6 |  | Volume | Speaker-SAMSUNG-Volume - | SET-TOP BOX-**-Channel - | |
| | ... | ... | ... | ...... | ...... | ...... |

SETTING TABLE (1000)

FIG.10A 1051 1053 1055

| Object No. | Shape | Subtitle | Command #1 | Command #2 |
|---|---|---|---|---|
| 1 |  | Power | TV-SAMSUNG-POWER ON/OFF<br>SET-TOP BOX-**-POWER ON/OFF | |
| 2 |  | External input | TV-SAMSUNG-External input mode change | |
| 3 |  | Channel | SET-TOP BOX-**-Channel + | |
| 4 |  | Channel | SET-TOP BOX-**-Channel - | |
| 5 |  | Volume | Speaker-SAMSUNG-Volume + | SET-TOP BOX-**-Volume + |
| 6 |  | Volume | Speaker-SAMSUNG-Volume - | SET-TOP BOX-**-Volume - |
| ... | ... | ... | ...... | ...... |

1061 (arrow pointing to row 5)

SETTING TABLE (1040)

METHOD AND APPARATUS FOR REMOTE CONTROL

CLAIM OF PRIORITY

The present application claims the benefit under 35 U.S.C. § 119(a) to a Korean patent application filed in the Korean Intellectual Property Office on Dec. 16, 2014, and assigned Serial No. 10-2014-0181534, the entire disclosure of which is hereby incorporated by reference.

TECHNICAL FIELD

The present disclosure relates to electronic devices, in general, and more particularly to a method and apparatus for remote control.

BACKGROUND

An electronic device such as a home appliance (e.g., an audio system, an air conditioner, a Television (TV), etc.) provides a wireless or wired remote control for controlling the electronic device. The remote control is not limited to the electronic device such as a TV or an audio system, which needs to control a channel and a volume, but is also applied to cooling and heating facilities such as an air conditioner and a fan, and digital devices such as a Digital Video Disc (DVD) player and a light. The wireless remote control can control distant electronic devices by generating and outputting a signal (an Infrared (IR)-Light Emitting Diode (LED) signal including data code). In recent, an electronic device (e.g., a smart phone, a tablet computer, a portable computer device) for executing various functions can control the various functions using the remote control (e.g., an IR LED output controller).

An all-in-one remote control (e.g., two or more remote controls configured in a single device) having various functions can be used. However, the all-in-one remote control requires a number of input buttons in order to control the various functions. In addition, unnecessary buttons used less frequently by a user can degrade utilization. When a new electronic device is added, the all-in-one remote control cannot store all of codes of the added electronic device.

SUMMARY

According to aspects of the disclosure, a method comprising: determining at least one object; associating at least one control signal with the object; and outputting the control signal corresponding to the object.

According to aspects of the disclosure, an electronic device is provided comprising: a communication module; and at least one processor functionally coupled to the communication module, the at least one processor being configured to: determine at least one object; associate at least one control signal with the object; and output the control signal corresponding to the object.

BRIEF DESCRIPTION OF THE DRAWINGS

The above and other aspects, features, and advantages of certain exemplary embodiments of the present disclosure will be more apparent from the following description taken in conjunction with the accompanying drawings, in which:

FIG. 10A is a diagram of an example of a setting table, according to an embodiment of the present disclosure;

Throughout the drawings, like reference numerals will be understood to refer to like parts, components and structures.

DETAILED DESCRIPTION

Figure 1:
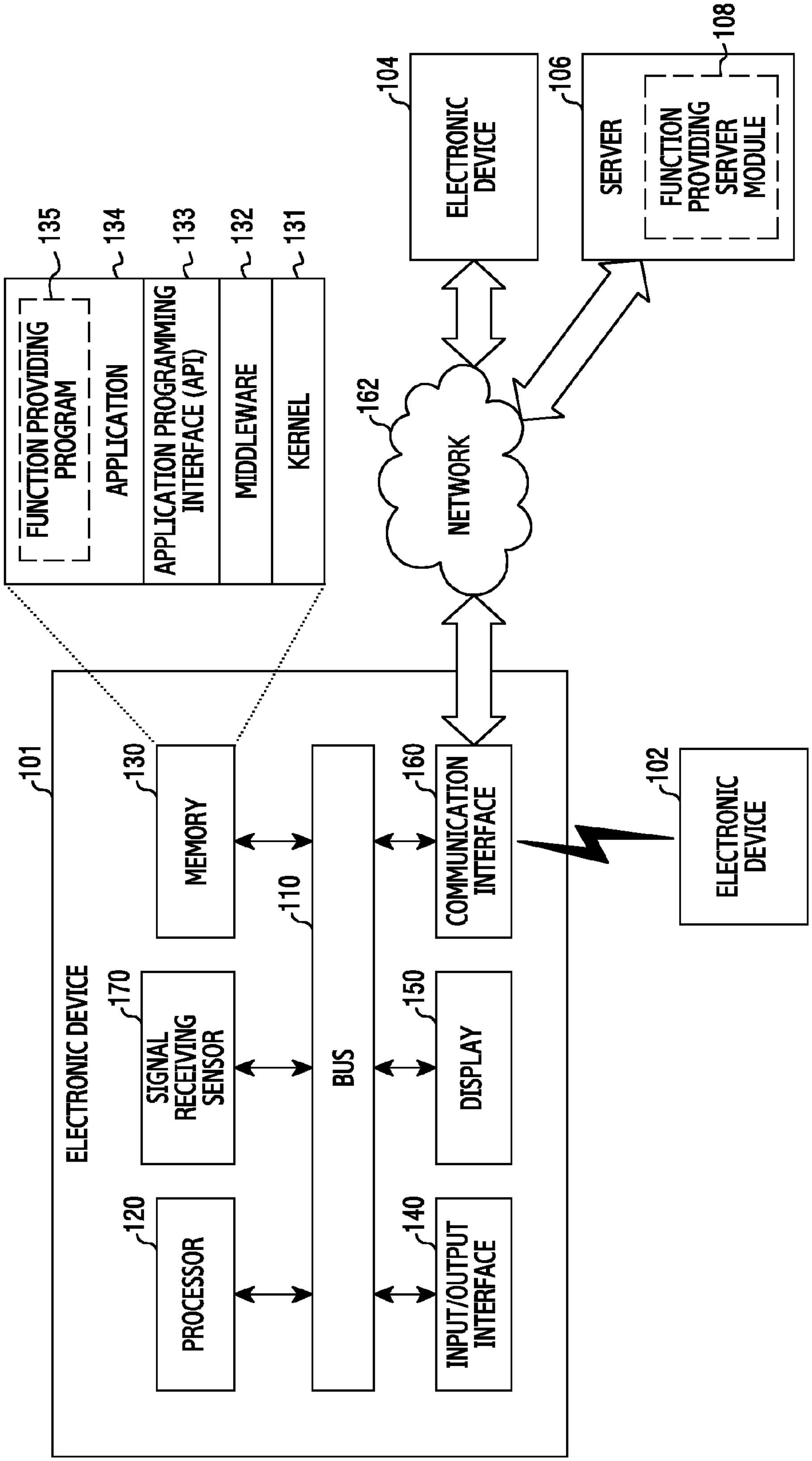
FIG. 1 is a diagram of an example of a network including an electronic device, according to an embodiment of the present disclosure.

The following description with reference to the accompanying drawings is provided to assist in a comprehensive understanding of embodiments of the disclosure as defined by the claims and their equivalents. It includes various specific details to assist in that understanding, but these are to be regarded merely as examples. Accordingly, those of ordinary skill in the art will recognize that various changes and modifications of the embodiments described herein can be made without departing from the scope and spirit of the present disclosure. In addition, descriptions of well-known functions and constructions may be omitted for clarity and conciseness.

As used in the present disclosure, terms such as "includes" or "may include" refer to the presence of the corresponding function, operation or feature, and do not limit the presence of additional functions, operations or features. Also, terms such as "includes" or "has" refer to the presence of characteristics, numbers, operations, operations, components or combinations thereof, and is not intended to exclude one or more additional characteristics, numbers, operations, operations, components or combinations thereof.

As used in the present disclosure, the term "or" is used to include any and all combination of terms listed. For examples, "A or B" includes only A, only B, or both A and B.

As used in the present disclosure, terms such as "first" or "second" may be used to describe various features, but do not limit such features. For example, the terms do not limit the order and/or the importance of their associated features.

Such terms may be used to differentiate one feature from another. For example, a first user equipment (UE) and a second user equipment may be different types of user equipment. For example, without departing from the scope of the present disclosure, a first component may be referred to as a second component, and likewise, a second component may be referred to as a first component.

If a component is said to be "connected with" or "connected to" another component, the component may be directly connected with, or connected to, the other component, or another component may exist in between. On the other hand, if a component is said to be "directly connected with" or "directly connected to" another component, it should be understood that no components exist in between.

By the term "substantially" it is meant that the recited characteristic, parameter, or value need not be achieved exactly, but that deviations or variations, including, for example, tolerances, measurement error, measurement accuracy limitations and other factors known to those of skill in the art, may occur in amounts that do not preclude the effect the characteristic was intended to provide.

An electronic device according to various embodiments of the present disclosure can include a signal receiving sensor. For example, the signal receiving sensor can include a sensor, such as a camera, an image sensor, or an Infrared (IR) sensor, for receiving a signal from outside of the electronic device. For example, an electronic device can include any one of a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), a Moving Picture Experts Group Audio Layer 3 (MP3) player, a mobile medical appliance, a camera, and a wearable device (e.g., a Head Mounted Device (HMD) such as electronic glasses, electronic garments, an electronic bracelet, an electronic necklace, an electronic appcessory, an electronic tattoo, and a smart watch). An electronic device can include one of smart home appliances, for example, a television, a Digital Video Disk (DVD) player, an audio system, a refrigerator, an air conditioner, a vacuum cleaner, an oven, a microwave oven, a washing machine, an air purifier, a set-top box, a TV box (e.g., Samsung HomeSync™, AppleTV™, or Google TV™), game consoles, an electronic dictionary, a digital key, a camcorder, and a digital frame. An electronic device can include any one of a medical device (e.g., a Magnetic Resonance Angiography (MRA) device, a Magnetic Resonance Imaging (MRI) device, a Computed Tomography (CT) device, a medical imaging device, an ultrasonic device, etc.), a navigation device, a Global Positioning System (GPS) receiver, an Event Data Recorder (EDR), a Flight Data Recorder (FDR), a vehicle infotainment device, a marine electronic equipment (e.g., a marine navigation system, a gyro compass, etc.), avionics, security equipment, a vehicle head unit, an industrial or household robot, a financial institution's Automatic Teller's Machine (ATM), and a store's Point Of Sales (POS). An electronic device can include at least one of part of furniture or building/structure, an electronic board, an electronic signature receiving device, a projector, and various measuring instruments (e.g., water, electricity, gas, or radio signal measuring instruments). In various embodiments of the present disclosure, an electronic device can be one of the above-mentioned various devices or a combination thereof. An electronic device can be a flexible electronic device. Additionally, an electronic device is not limited to the above-mentioned devices and can include a new kind of an electronic device according to the technology development.

Hereinafter, an electronic device according to various embodiments of the present disclosure will be described in more detail with reference to the accompanying drawings. In this specification, the term "user" may refer to a person using an electronic device or a device using an electronic device (e.g., an artificial intelligent electronic device).

FIG. 1 depicts a network environment including an electronic device according to an embodiment of the present disclosure.

Referring to FIG. 1, the electronic device 101 can include at least one of a bus 110, a processor 120, a memory 130, an input/output interface 140, a display 150, and a communication interface 160.

The bus 110 can include a circuit connecting the components 110 to 170 and delivering communication signals (e.g., control messages) therebetween.

The processor 120 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. The processor 120 can receive an instruction from the other components (e.g., the memory 130, the input/output interface 140, the display 150, and the communication interface 160) via the bus 110, interpret the received instruction, and process an operation or data according to the interpreted instruction.

At least one processor 120 can be included in the electronic device 101 to execute a preset function of the electronic device 101. According to an embodiment of the present disclosure, the processor 120 can include one or more Application Processors (APs) and one or more Micro Controller Units (MCUs). According to another embodiment of the present disclosure, the processor 120 can include one or more MCUs as an application or can be functionally connected to one or more MCUs. In FIG. 1, the AP and the MCU can be included in a single Integrated Circuit (IC) package or separated in different IC packages. The MCU may be included in the IC package of the AP to configure a single IC package. While the processor 210 includes the AP or the MCU to assist in a comprehensive understanding, it is noted that the processor 120 can function as the AP and/or the MCU.

The AP can control a plurality of hardware or software components connected to the AP by driving an operating system or an application program, and process various data including multimedia data and operations. The AP can be implemented with, for example, a System on Chip (SoC). The AP can further include a Graphic Processing Unit (GPU).

The MCU can be a processor designated to execute a preset function. The MCU can acquire sensing information through one or more preset motion sensors (e.g., a gyro sensor, an acceleration sensor, or a geomagnetic sensor), compare the acquired sensing information, and determine an operation status of the preset sensor based on a database of the electronic device 101.

The AP or the MCU can load and process commands or data received from its connected nonvolatile memory or at least one of other components, into volatile memory. The AP or the MCU can store data received from at least one of the other components or data generated by at least one of the other components, in a nonvolatile memory.

The memory 130 may include any suitable type of volatile or non-volatile memory, such as Random-access Memory (RAM), Read-Only Memory (ROM), Network Accessible Storage (NAS), cloud storage, a Solid State Drive (SSD), etc. The memory 130 (e.g., a memory 230) can store commands or data received from the processor 120 or the other components (e.g., the input/output interface 140, the display 150, and the communication interface 160) or generated by the processor 120 or the other components. The memory 130, for example, can include programming modules of a kernel 131, middleware 132, an Application Programming Interface (API) 133, and/or an application 134. The programming modules can be implemented using software, firmware, and hardware, or a combination of at least two of them.

The kernel 131 can control or manage system resources (e.g., the bus 110, the processor 120, or the memory 130) used for performing operations or functions implemented by the other programming modules, for example, the middleware 132, the API 133, or the application program 134. Additionally, the kernel 131 can provide an interface for controlling or managing system resources by accessing an individual component of the electronic device 101 from the middleware 132, the API 133, or the application 134.

The middleware 132 can serve as an intermediary role for exchanging data between the API 133 or the application 134 and the kernel 131 through communication. Additionally, in relation to job requests received from the application 134, the middleware 132 can perform a control (e.g., scheduling or load balancing) for the job requests by assigning a priority for using the system resource (e.g., the bus 110, the processor 120, or the memory 130) of the electronic device 101 to at least one of the application 134.

The API 133, as an interface through which the application 134 controls a function provided by the kernel 131 or the middleware 132, for example, can include at least one interface or function (e.g., an instruction) for file control, window control, image processing, or character control.

The application 134 (or the processor) can include a Short Message Service (SMS)/Multimedia Messaging Service (MMS) application, an e-mail application, a calendar application, an alarm application, a healthcare application (e.g., an application for measuring an amount of exercise, a blood sugar level, and/or the like), or an environmental information application (e.g., an application for providing air pressure, humidity, temperature information, and/or the like). The application 134 (or the processor) can be involved in information exchange between the electronic device 101 and an external electronic device (e.g., an electronic device 102 or an electronic device 104). The information exchange application can include, for example, a notification relay application for relaying certain information to an external electronic device, or a device management application for managing the external electronic device. For example, the notification relay application can relay the notification information of another application (e.g., an SMS/MMS application, an e-mail application, a health care application, an environmental information application, and/or the like) of the electronic device 101 to the external electronic device (e.g., the electronic device 104). Additionally or alternatively, the notification relay application can receive and provide the notification information from the external electronic device (e.g., the electronic device 104) to the user. The device management application can turn on/off at least part of the function (e.g., the external electronic device (or some other components)) of the external electronic device (e.g., the electronic device 104) communicating with the electronic device 101, control brightness (or resolution) of the display, and manage (e.g., install, delete, or update) a service (e.g., a call service or a messaging service) provided by an application of the external electronic device or by the external electronic device itself. The application 134 can include an application designated based on an attribute (e.g., a type of the electronic device) of the external electronic device (e.g., the electronic device 102 or the electronic device 104). For example, when the external electronic device is an MP3 player, the application 134 can include a music playing application. Similarly, when the external electronic device is a mobile medical device, the application 134 may include a health care application. The application 134 can include at least one of the applications designated in the electronic device 101, and the application received from the external electronic device (e.g., a server 106 or the electronic device 104). A function providing program 135 can be included in the application 134 or stored in a memory 130 as a separate program.

The function providing program 135 can display at least one object on the display, set at least one control signal for the object, and output the control signal of the selected object through the communication interface. The function providing program 135 can display an image generated based on at least one of tapping, dragging, and drawing which is input to the display, as an object. The function providing program 135 can determine a signal for controlling a function of another electronic device, as the control signal. The function providing program 135 can define at least two control signals for the object. The function providing program 135 can output the control signal of the selected object by outputting two or more control signals at the same time, outputting at least one of two or more control signals, or outputting two or more control signals in sequence. The function providing program 135 can include two or more second objects of at least one control signal in the object. The function providing program 135 can output at least one of the control signals of the second object of the object, as the control signal of the selected object.

The function providing program 135 can display a first object on the display, display at least one second object in the first object, and output a control signal of the selected second object through the communication interface. When detecting a closed curve drawn on the display, the function providing program 135 can display the first object. The function providing program 135 can display at least one second object selected from an object list displayed in part of the display, in the first object. The function providing program 135 can display at least one second object in the first object based on the image drawn on the first object. The function providing program 135 can determine a second object matching the drawn image and set the control signal of the second object in the image. The function providing program 135 can determine a second object matching the image drawn in the first object and change the drawn image with the second object. The function providing program 135 can add a control signal for controlling a function of another electronic device to the second object. The function providing program 135 can add two or more control signals to the second object. The function providing program 135 can output different control signals based on a second object selection style. The function providing program 135 can control to output the control signal using at least one of an IR transceiving sensor, Bluetooth communication, Bluetooth Low Energy (BLE) communication, and Near Field Communication (NFC).

The input/output interface 140 can forward an instruction or data input from the user through an input/output device (e.g., various sensors such as an acceleration sensor and a gyro sensor and/or a device such as a keyboard or a touch screen) to, for example, the processor 120, the memory 130, or the communication interface 160 via the bus 110. For example, the input/output interface 140 can forward data of a user's touch input through a touch screen, to the processor 120. The input/output interface 140 can output an instruction or data received from the processor 120, the memory 130, or the communication interface 160 via the bus 110, through an output device (e.g., a speaker or a display). For example, the input/output interface 140 can output voice data processed by the processor 120 to the user through the speaker.

The display 150 can display various information (e.g., multimedia data or text data) to the user. The display 150 may include a touch screen for inputting a command by touching or approaching the display with an input means.

The communication interface 160 (e.g., a communication module 220) can establish the communication between the electronic device 101 and the external device (e.g., the electronic device 104 or the server 106). For example, the communication interface 160 can communicate with the external device over a network 162 using wireless communication or wired communication. The wireless communication can include at least one of, for example, Wireless Fidelity (WiFi), Bluetooth (BT), NFC, GPS, and cellular communication (e.g., Long Term Evolution (LTE), LTE-Advanced (LTE-A), Code Division Multiple Access (CDMA), Wideband CDMA (WCDMA), Universal Mobile Telecommunications System (UMTS), WiBro, or Global System for Mobile Communications (GSM)). The wired communication can include at least one of, for example, a Universal Serial Bus (USB), a High-Definition Multimedia Interface (HDMI), a Recommended Standard (RS) 232, a Plain Old Telephone Service (POTS), and/or the like.

A signal receiving sensor 170 can receive at least one signal from the outside of the electronic device 101. The signal receiving sensor 170 can include a sensor for receiving a particular signal from the outside of the electronic device 101, such as a camera, an IR sensor, an image sensor, or a microphone.

The network 162 can be a telecommunications network. The telecommunications network can include at least one of a computer network, the Internet, Internet of things, and a telephone network. The protocol (e.g., transport layer protocol, data link protocol or physical layer protocol) for the communication between the electronic device 101 and the external device can be supported by at least one of the application 134, the API 133, the middleware 132, the kernel 131, and the communication interface 160.

The server 106 can support the electronic device 101 by executing at least one of the operations (or the functions) of the electronic device 101. For example, the server 106 can include the processor 120 for controlling to fulfill various embodiments of the present disclosure, to be explained, or a server module (e.g., a server controller or a server processor (not shown)) for supporting a particular module to fulfill various embodiments of the present disclosure. For example, the server module can include at least one component of the processor 120 or the particular module, and fulfill (e.g., execute) at least one of the operations of the processor 120 or the particular module. The server module can be represented as a function providing server module 108 of FIG. 1.

Additional information regarding the electronic device 101 can be described as shown in FIG. 2 through FIG. 13 to be explained.

Figure 2:
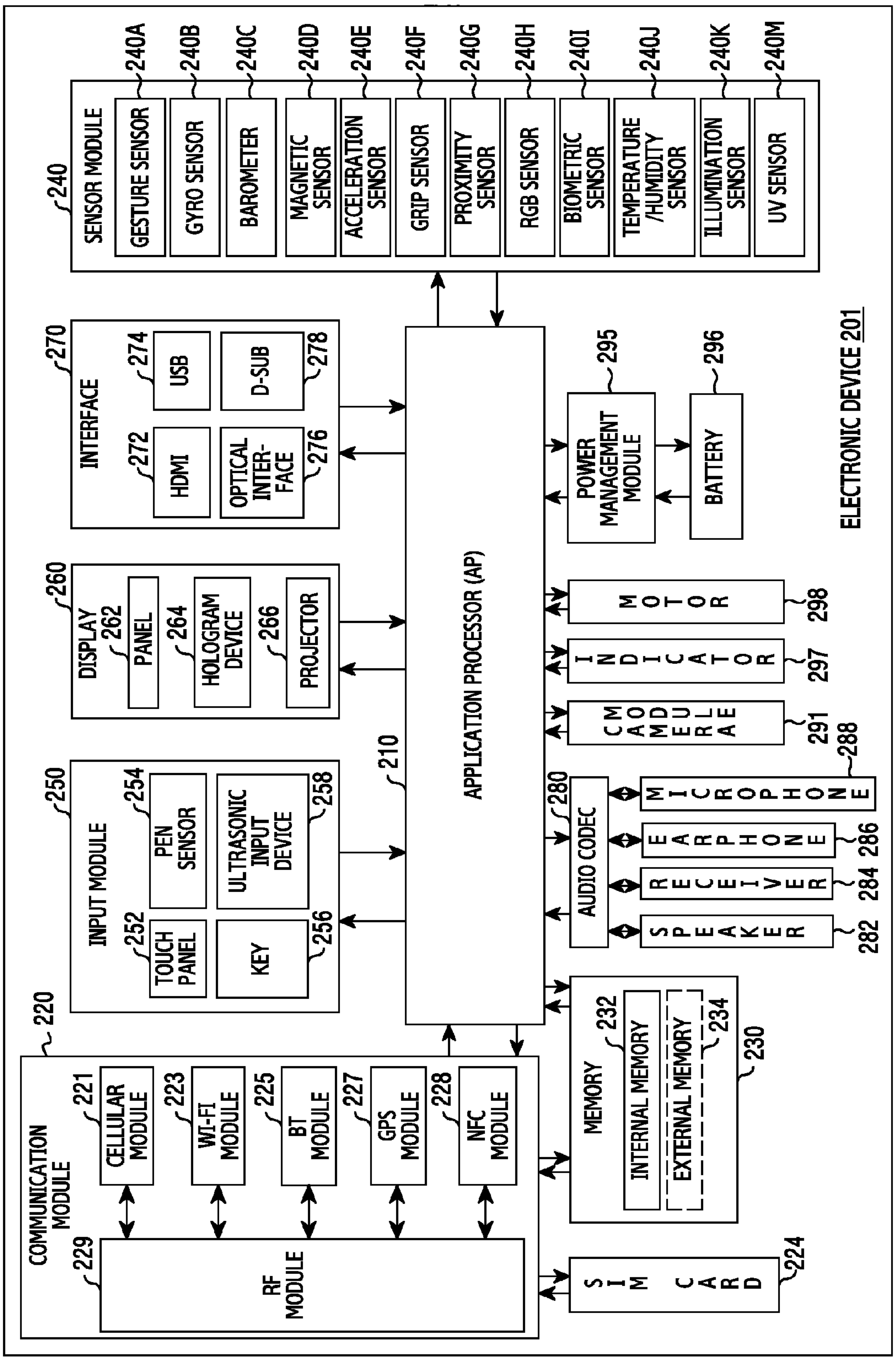
FIG. 2 is a diagram of an example of an electronic device, according to an embodiment of the present disclosure.

FIG. 2 is a block diagram of an electronic device according to an embodiment of the present disclosure.

The electronic device 201, for example, can include or expand all or part of the electronic device 101 of FIG. 1. Referring to FIG. 2, the electronic device 201 can include at least one processor 210, a communication module 220, a Subscriber Identification Module (SIM) card 224, a memory 230, a sensor module 240, an input device 250, a display 260, an interface 270, an audio module 280, a camera module 291, a power management module 295, a battery 296, an indicator 297, and a motor 298.

At least one processor 210 can be included in the electronic device 101 to execute a preset function of the electronic device 101. According to an embodiment of the present disclosure, the processor 210 can include one or more APs and one or more MCUs. According to another embodiment, the processor 210 can include one or more MCUs as an application or can be functionally connected to one or more MCUs. In FIG. 1, the AP and the MCU can be included in a single IC package or separated in different IC packages. The MCU may be included in the IC package of the AP to configure a single IC package. While the processor 210 includes the AP or the MCU to assist in a comprehensive understanding, it is noted that the processor 210 can function as the AP and/or the MCU.

The AP can control a plurality of hardware or software components connected to the AP by executing an operating system or an application program, and also perform various data processing and operations. The AP can be implemented with a SoC. The processor 210 can further include a GPU (not shown).

The MCU can be a processor configured to execute a preset function. According to an embodiment of the present disclosure, the MCU can acquire sensing information using one or more preset motion sensors (e.g., a gyro sensor, an acceleration sensor, or a geomagnetic sensor), compare the acquired sensing information, and determine an operation status of the preset sensor (e.g., the geomagnetic sensor 240P) based on a database of the electronic device 201. While the MCU and the components of the sensor module 240 are separately illustrated in FIG. 2, the MCU may include at least part (e.g., at least one of the gyro sensor, the acceleration sensor, and the geomagnetic sensor) of the components of the sensor module 240.

The AP or the MCU can load and process commands or data received from its connected nonvolatile memory or at least of other components, into volatile memory. The AP or the MCU can store data received from at least one of the other components or data generated by at least one of the other components, in a nonvolatile memory.

The communication module 220 (e.g., the communication interface 160) can transmit and receive data in communications between the electronic device 201 and other electronic devices (e.g., the electronic device 102, the electronic device 104, or the server 106) connected to the electronic device 201 over a network. The communication module 220, for example, can include a cellular module 221, a WiFi module 223, a BT module 225, a GPS module 227, an NFC module 228, and a Radio Frequency (RF) module 229.

The function providing program 135 can control to output the control signal through at least one of the cellular module 221, the WiFi module 223, the BT module 225, the GPS module 227, the NFC module 228, and the RF module 229.

The cellular module 221 can provide voice call, video call, SMS, or Internet service through a communication network (e.g., LTE, LTE-A, CDMA, WCDMA, UMTS, WiBro, or GSM). Also, the cellular module 221 can identify and authenticate an electronic device in the communication network using the SIM (e.g., the SIM card 224). The cellular module 221 can perform at least part of functions provided by the AP 210. For example, the cellular module 221 can perform at least part of a multimedia control function.

The cellular module 221 can include a CP. The cellular module 221 can be implemented using, for example, a SoC. While the components of the cellular module 221 (e.g., the CP), the memory 230, and the power management module 295 are separated from the AP 210 in FIG. 2, the AP 210 can include at least part (e.g., the cellular module 221) of the above-stated components.

The AP 210 or the cellular module 221 (e.g., the CP) can load and process the instruction or the data received from its connected non-volatile memory or at least one of the other components, in a volatile memory. Also, the AP 210 or the cellular module 221 can store data received from or generated by at least one of the other components, in the non-volatile memory.

Each of the WiFi module 223, the BT module 225, the GPS module 227, and the NFC module 228 can include a processor for processing data transmitted/received through a corresponding module. While the cellular module 221, the Wifi module 223, the BT module 225, the GPS module 227, and the NFC module 228 are separated from each other in FIG. 2, at least part (e.g., at least two) of the cellular module 221, the Wifi module 223, the BT module 225, the GPS module 227, and the NFC module 228 can be included in a single IC or an IC package. For example, at least part (e.g., the CP corresponding to the cellular module 221 and the Wifi processor corresponding to the Wifi module 223) of the processors corresponding to the cellular module 221, the Wifi module 223, the BT module 205, the GPS module 227, and the NFC module 228 can be implemented using a single SoC.

The RF module 229, for example, can transmit/receive a communication signal, for example, an RF signal. The RF module 229, for example, can include a transceiver, a Power Amp Module (PAM), a frequency filter, or a Low Noise Amplifier (LNA). Also, the RF module 229 can further include a component, for example, a conductor or a conducting wire, for sending and receiving electromagnetic waves in free space during the wireless communication. While the cellular module 221, the Wifi module 223, the BT module 225, the GPS module 227, and the NFC module 228 share the single RF module 229 in FIG. 2, at least one of the cellular module 221, the Wifi module 223, the BT module 225, the GPS module 227, and the NFC module 228 may transmit and receive the RF signals via a separate RF module.

The SIM card 224 can be a card including the SIM and inserted into a slot formed at a specific location of the electronic device. The SIM card 224 may include unique identification information (e.g., Integrated Circuit Card Identifier (ICCID)) or subscriber information (e.g., International Mobile Subscriber Identity (IMSI)).

The memory 230 (e.g., the memory 130) can include an internal memory 232 or an external memory 234. For example, the internal memory 232 can include at least one of the volatile memory (e.g., Dynamic RAM (DRAM), Static RAM (SRAM), Synchronous Dynamic RAM (SDRAM)) and the non-volatile memory (e.g., One-Time Programmable ROM (OTPROM), Programmable ROM (PROM), Erasable and Programmable ROM (EPROM), Electrically Erasable and Programmable ROM (EEPROM), mask ROM, flash ROM, NAND flash memory, and NOR flash memory).

The internal memory 232 can be a Solid State Drive (SSD). The external memory 234 can further include a flash drive, for example, a Compact Flash (CF), a Secure Digital (SD), a Micro-SD, a Mini-SD, an extreme digital (xD), or a memory stick. The external memory 234 can be functionally connected to the electronic device 201 via various interfaces. The electronic device 201 can further include a storage device (or a storage medium) such as a hard drive.

The sensor module 240 can measure a physical quantity or detect an operation status of the electronic device 201, and convert the measured or detected information to an electric signal. The sensor module 240 can include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., an Red, Green, Blue (RGB) sensor), a biometric sensor 240I, a temperature/humidity sensor 240J, a light sensor 240K, or an UltraViolet (UV) sensor 240M. Additionally or alternatively, the sensor module 240 can include, for example, an E-noise sensor (not shown), an electromyography (EMG) sensor (not shown), an electroencephalogram (EEG) sensor (not shown), an electrocardiogram (ECG) sensor (not shown), an Infra Red (IR) sensor (not shown), an iris sensor (not shown), or a fingerprint sensor (not shown). The sensor module 240 can further include a control circuit for controlling its one or more sensors.

The input device 250 can include a touch panel 252, a (digital) pen sensor 254, a key 256, or an ultrasonic input device 258. For example, the touch panel 252 can recognize touch input using at least one of capacitive, resistive, infrared, and ultrasonic wave techniques. Also, the touch panel 252 can further include a controller. The capacitive type may recognize physical contact or proximity. The touch panel 2052 may further include a tactile layer. In this case, the touch panel 252 can provide a tactile response to the user.

The (digital) pen sensor 254 can be implemented using, for example, the same or similar method as or to the user's touch input, or using a separate recognition sheet. For example, the key 256 can include, for example, a physical button, an optical key, or a keypad. The ultrasonic input device 258 is a device capable of obtaining data by detecting microwaves through a microphone (e.g., a microphone 288) in the electronic device 201 through an input tool which generates an ultrasonic signal, allows radio frequency identification. The electronic device 201 may receive user input from an external device (e.g., a computer or a server) connected using the communication module 220.

The display 260 (e.g., the display 150) can include a panel 262, a hologram device 264, or a projector 266. The panel 262 can employ, for example, a Liquid Crystal Display (LCD) or an Active-Matrix Organic Light-Emitting Diode (AMOLED). The panel 262 can be implemented, for example, flexibly, transparently, or wearably. The panel 262 can be constructed as the single module with the touch panel 252. The hologram device 264 can present a three-dimensional image in the air using interference of light. The projector 266 can display the image by projecting the light onto a screen. The screen can be placed, for example, inside or outside the electronic device 201. The display 260 can further include a control circuit for controlling the panel 262, the hologram device 264, or the projector 266.

The interface 270 can include, for example, an HDMI 272, a USB 274, an optical interface 276, or a D-subminiature (D-sub) 278. The interface 270 can be included in, for example, the communication interface 160 of FIG. 1. Additionally or alternatively, the interface 270 can include, for example, Mobile High-Definition Link (MHL) interface, SD card/Multi-Media Card (MMC) interface, or Infrared Data Association (IrDA) standard interface. The optical interface 276 can construct a communication system for delivering signals to or from at least one module of the electronic device 201 through an optical cable or a laser, or transmit/receive data through an optical cable connected to at least one other electronic device or a laser. The electronic device 201 can output a predefined IR signal of IrDA communication standard and thus send a preset control signal to at least one other electronic device which receives the IR signal.

The audio module 280 can convert sound to an electric signal and vice versa. At least part of the audio module 280 can be included in, for example, the input/output interface 140 of FIG. 1. The audio module 280 can process sound information which is input or output through, for example, a speaker 282, a receiver 284, an earphone 286, or the microphone 288. The camera module 291 is a device for capturing a still picture and a moving picture, and can include one or more image sensors (e.g., a top sensor or a bottom sensor), a lens (not shown), an Image Signal Processor (ISP) (not shown), or a flash (e.g., an LED or a xenon lamp) (not shown).

The power management module 295 can manage the power of the electronic device 201. The power management module 295 can include a power management IC (PMIC), a charger IC, or a battery or fuel gauge. The PMIC can be mounted in, for example, an IC or a SoC conductor. The charging type may be divided into a wired type and a wireless type. The charger IC may charge the battery, and prevent overvoltage or overcurrent flow from the charger.

The charger IC can include a charger IC for at least one of the wired charging type or the wireless charging type. The wireless charging type includes, for example, a magnetic resonance type, a magnetic induction type, or a microwave type, and may add an additional circuit for the wireless charging, for example, a circuit such as a coil loop, a resonance circuit, or a rectifier.

The battery gauge can, for example, measure the remaining capacity of the battery 296 and the voltage, the current, or the temperature of the charging. The battery 296 can generate or store electricity, and supply the power to the electronic device 201 using the stored or generated electricity. The battery 296 may include, for example, a rechargeable battery or a solar battery The indicator 297 can display a specific status of the electronic device 201 or its part (e.g., the AP 210), for example, booting state, message state, or State of Charge (SOC). The motor 299 may convert the electric signal to a mechanic vibration. Although it is not depicted, the electronic device 201 may include a processing device (e.g., a GPU) for mobile TV support. The processing device for the mobile TV support may process media data in conformity to a standard, for example, Digital Multimedia Broadcasting (DMB), Digital Video Broadcasting (DVB), or media flow.

The aforementioned components of the electronic device according to various embodiments of the present disclosure each may include one or more components, and the name of the corresponding component may differ according to the type of the electronic device. The present electronic device may include at least one of the aforementioned components, omit some components, or further include other components. Also, some of the components of the present electronic device may be united into a single entity to thus carry out the same functions of the corresponding components.

Hereinafter, the electronic device 101 can include a remote control function for controlling at least one other electronic device (e.g., an electronic device 102 and/or an electronic device 103). Each electronic device (e.g., a TV, an air conditioner, etc.) can receive a preset control signal and execute the corresponding function of the electronic device. Herein, the preset control signal can differ according to the electronic device and/or a manufacturer. Each electronic device (e.g., a TV, an air conditioner, etc.) can provide the remote control configured to output (e.g., emit) the control signal so as to control at least one function. The electronic device 101 can include the remote control function for controlling at least one other electronic device (e.g., the electronic device 102 and/or the electronic device 103), and control at least one other electronic device (e.g., the electronic device 102 and/or the electronic device 103).

Figure 3:
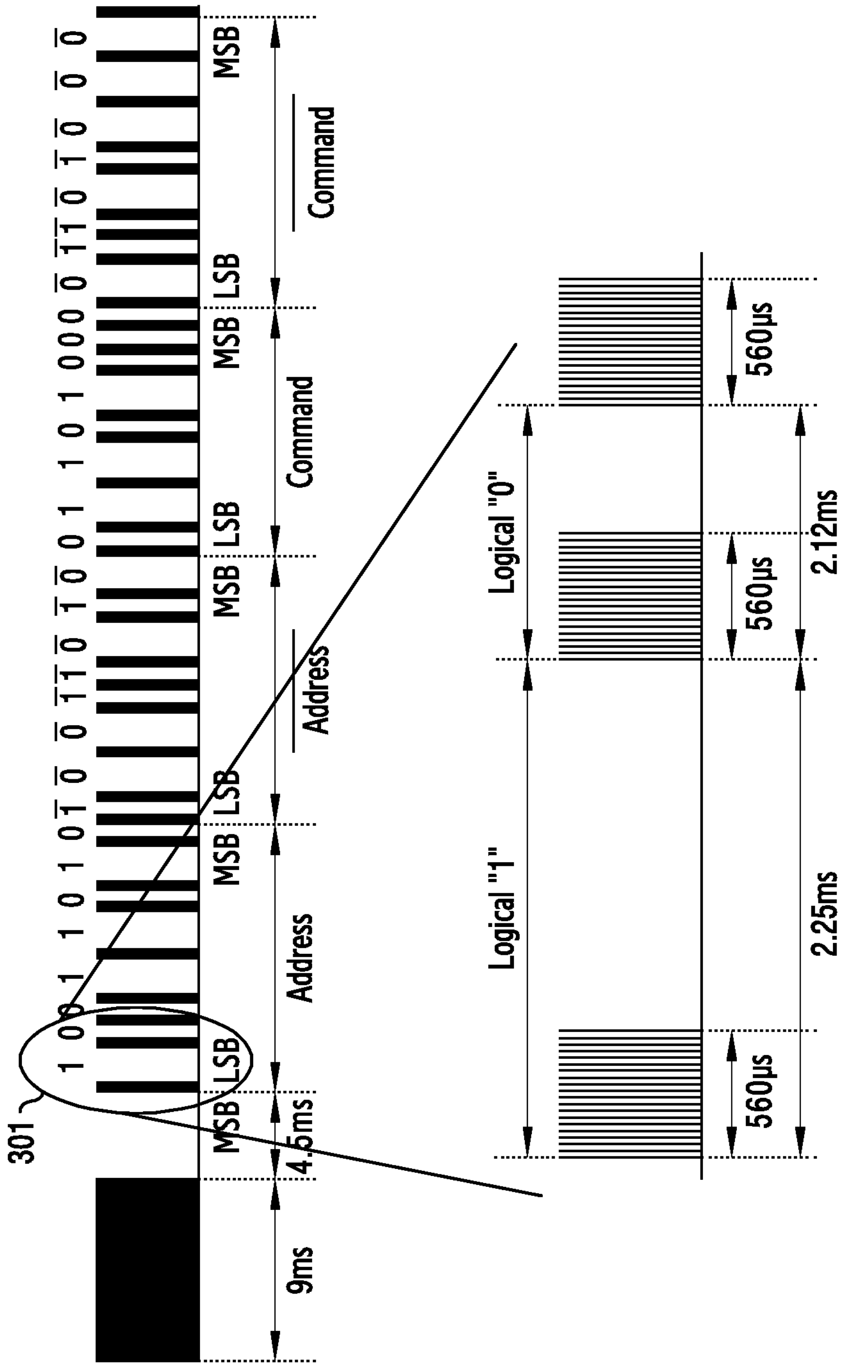
FIG. 3 is a diagram of an example, of a protocol data unit containing a remote control code, according to an embodiment of the present disclosure.

FIG. 3 is a diagram of an example, of a protocol data unit containing a remote control code, according to an embodiment of the present disclosure. For the remote control function, the electronic device 101 can use different remote control of codes depending on a type of the electronic device so as to prevent an output control signal error in the corresponding electronic device. The remote control code may include a sequence of bits, and each bit may be encoded by switching an LED on and off. When the High is constant and the following Low is long in the output signal of the electronic device 101, (bit) data can be set to 1. When the High is output and the Low is short, the (bit) data can be set to 0. The electronic device 101 can combine data according to a control signal for controlling another electronic device (e.g., the electronic device 102 and/or the electronic device 103) and thus use the combined data as a command for controlling the other electronic device.

As such, the electronic device 101 outputs the preset signal using IR and optical signal so that the output optical signal and the preset control signal can control at least one other electronic device.

Figure 4:
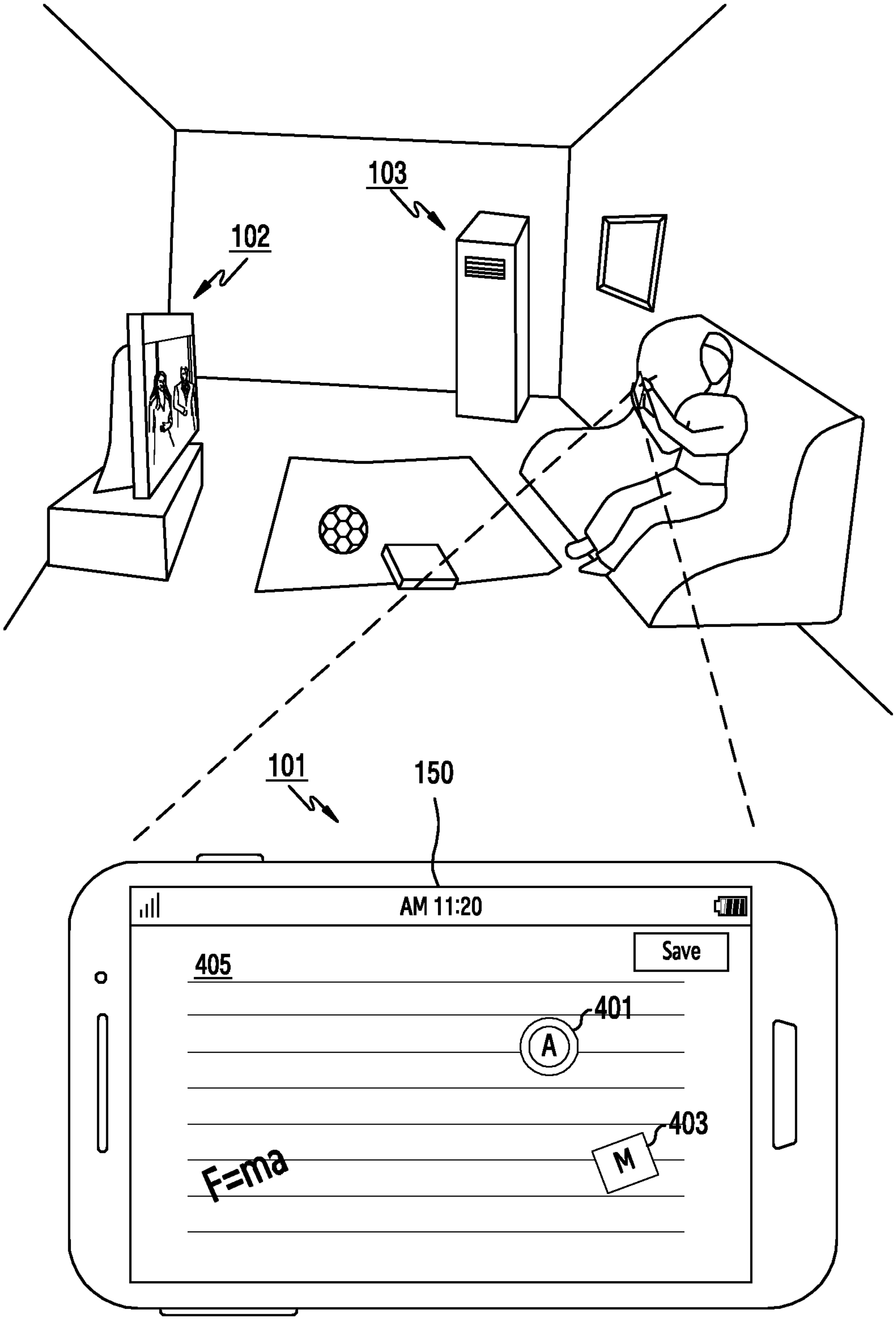
FIG. 4 is a diagram of an example of a user interface, according to an embodiment of the present disclosure.

FIG. 4 is a diagram of an example of a user interface, according to an embodiment of the present disclosure. As illustrated, the user interface can include an object for controlling other electronic devices, such as the electronic device 102 and/or the electronic device 103). The object may be generated when the electronic device is in a configuration mode, and presented to the user when the electronic device is in a remote control mode When in configuration mode, the electronic device 101 can generate at least one object on the display 150 based on a user input. For example, when the display 150 is a touch panel, the object generated on the display 150 of the electronic device 101 can include an image drawn with an input means (e.g., a user's finger, an input means such as a digital pen and/or a touch pen). Afterwards, the electronic device 101 can identify a matching object corresponding to a received input based on an object list of the electronic device 101. The matching object can include one or more of, an identifier corresponding to the input (e.g., a device name or a number), an image and/or an icon (e.g., an image of the device). The object list can include an identification of at least one particular image and at least one preset control signal corresponding to the image. In operation, the electronic device 101 can obtain an object 401 and identify an object (e.g., an image) matching the acquired object 401 based on the object list. Upon identifying the image matching the object 401, the electronic device 101 can identify a control signal associated with the image and include the identified control signal in the object 401. For example, when the control signal of the image matching the object 401 controls the power of an air conditioner, the electronic device 101 can associate the control signal for controlling the air conditioner power with the object 401. When the object 401 displayed on the display 150 is selected, the electronic device 101 can output the control signal for controlling the air conditioner power. When associating the control signal with the object 401, the electronic device 101 can change the image of the object 401 with the matching image identified in the object list.

The electronic device 101 can superimpose an object (e.g., the object 401 and/or an object 403) for controlling at least one other electronic device (e.g., the electronic device 102 and/or the electronic device 103) on the user interface of at least one other program (or application) as shown in FIG. 4. For example, the electronic device 101 can detect a user input on the display 150 during memo program execution. When the input matches a particular object, the electronic device 101 can set a corresponding control signal. The user input can be detected during, but not limited to, the memo program execution, and the electronic device 101 can superimpose the object 401 and/or the object 403 on the user interfaces of any suitable type of program that is being currently executed, such as media player or an Internet browser. The electronic device 101 can include the object 401 and/or the object 403 in, but not limited to, in a separate layer. For example, the electronic device 101 can generate a new layer which is not displayed (e.g., transparent) or is viewable (e.g., translucent) and superimpose that layer onto an application interface that is being displayed.

The objects presented on the display 150 may be defined in a nested fashion. The object displayed on the display 150 of the electronic device 101 can include at least one other object. For example, the electronic device 101 can generate an object including the control signal based on at least one list stored in the memory 130. Further, the object can be included in another object. For example, the object 401 can include the control signal for controlling the power of the air conditioner, and it can further include at least one other control signal and/or nested inside. For example, the electronic device 101 can include in the object 401, the object 403. The object 403 may include a control signal which controls MUTE of the TV. When the object 401 includes the object 403, the electronic device 101 can display an image of the object 403 in the image of the object 401. When detecting a user input selecting the object 401, the electronic device 101 can output at least one of the control signal (e.g., the control signal for controlling the air conditioner power) of the object 401 and the control signal (e.g., the control signal for controlling the TV MUTE) of the object 403. Herein, the electronic device 101 can determine which one of the control signal of the object 401 and/or the control signal of the object 403 is output, based on the user input. For example, the electronic device 101 can select at least one of the object 401 and the object 403 of the object 401, according to a pattern of the input (e.g., a single tap, a double tap, or a long press) which selects the object 401 on the display 150.

Moreover, the electronic device 101 can include the object 401 in another object. For example, the object including the object 401 need not be limited to an icon-type object and can be included in at least a part of a user interface of a particular program on the display 150 of the electronic device 101. For example, the object including the object 401 can be included in the user interface (e.g., a layer, hereinafter, an object 405) of a particular program (e.g., the memo program). Referring back to FIG. 4, the display 150 of the electronic device 101 can display the user interface (e.g., the object 405) of the particular program (e.g., the memo program), and display at least one object (e.g., the object 401 and/or the object 403) inside it. When detecting a user input to the object 405, the electronic device 101 can select at least one of the object 401 and the object 403 based on the user input, and output a control signal associated with the selected object, accordingly.

Additionally or alternatively, when an input to the object 405 is detected, the electronic device 101 can activate or deactivate at least one object that is nested in the object 405 based on the input. For example, when detecting a user input for selecting the object 405 of the display 150, the electronic device 101 can activate the inactive object 401. Afterwards, when the activated object 401 of the object 405 is selected on the display 150, the electronic device 101 can output the control signal for controlling the power of the TV. On the other hand, when object 401 is selected is selected when the object 401 is in an inactive state, the electronic device 101 may not output the control signal for controlling the TV power in the object 401.

When detecting a user input for changing a location of a layer (e.g., the object 405) of a particular program on the display 150, the electronic device 101 can also change a location of at least one other object (e.g., the object 401 and/or the object 403) of the object 405.

Figure 5A:
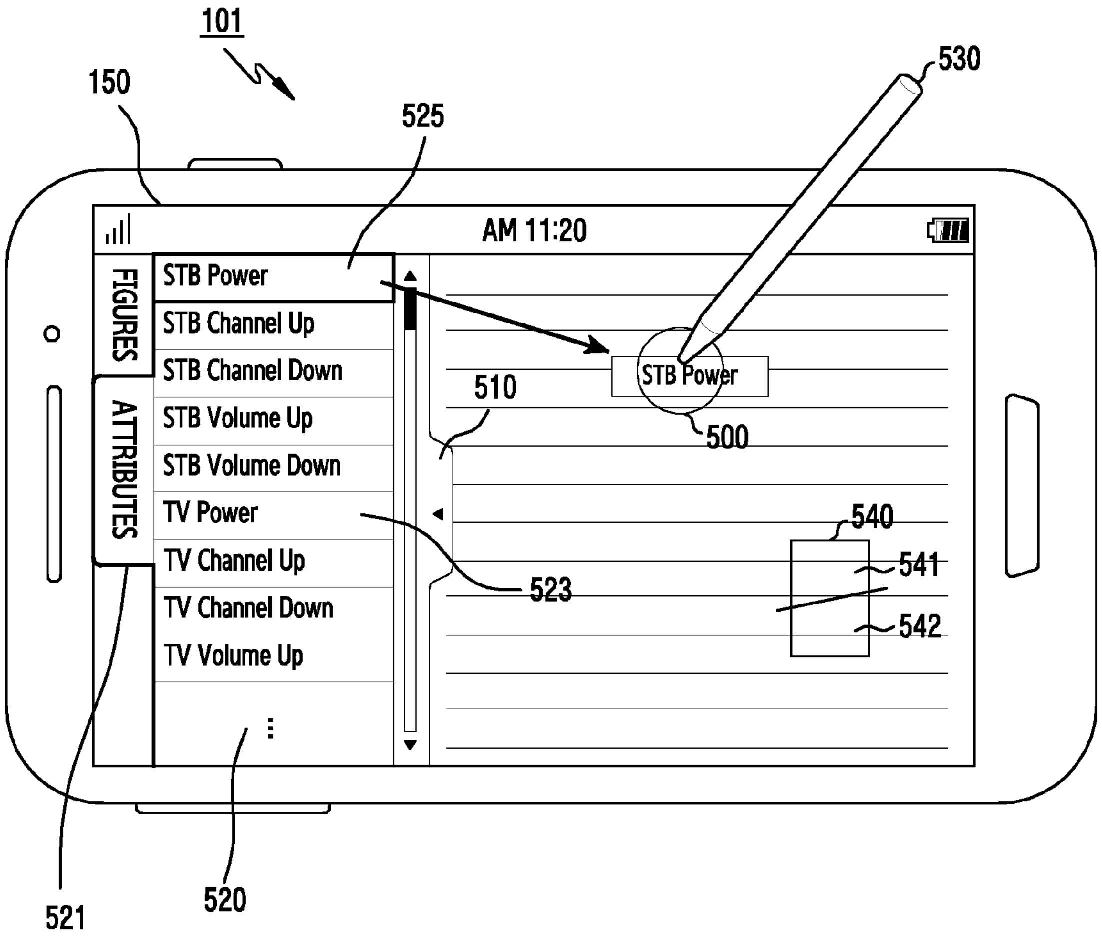
FIG. 5A is a diagram of an example of a user interface, according to an embodiment of the present disclosure.

FIG. 5A is a diagram of an example of a user interface, according to various embodiments of the disclosure. According to this example, the electronic device 101 can associate a control signal with an object that is hand-drawn on the display 150. The electronic device 101 can set a control signal of a particular object matching the object (e.g., the object 401 and/or the object 403) input to the display 150, in the input object as shown in FIG. 4, and set a control signal defined based on the user input, in the object hand-drawn on the display 150. For example, the object for setting at least one control signal is not limited to the preset image for matching a particular image, such as the object 401 or the object 403 on the display 150 of FIG. 4, and can include a circular, oval, or polygonal image (e.g., a figure) drawn arbitrarily by the user such as an object 500 and/or an object 540 input to the display 150 of FIG. 5.

In operation, in response to a user input, the electronic device 101 can configure an object 500 hand-drawn on the display 150. The electronic device 101 can display a menu 510 for selecting a control signal which controls at least one other electronic device. Next, the electronic device 101 can display an attribute list 520 in at least one tab 525 (e.g., submenu) of the menu 510. Using the attribute list 520, the electronic device 101 can provide the user with a list of control signals for controlling at least one function of another electronic device. Next, the electronic device 101 can select at least one control signal (e.g., a control signal 521) based on a user input and associate the control signal with the object. For example, the electronic device 101 can associate the control signal 521 with the object 500 when the user drags the control signal 521 into the object 500. Afterwards, when the user selects the object 500, the electronic device 101 can output the associated control signal 521 (e.g., a control signal for controlling the power of a set-top box).

The electronic device 101 may associate two or more control signals with the object 500. The electronic device 101 can detect a user input which selects and drags at least one control signal (e.g., a control signal 523) into the object 500 already including the control signal 521, and associate the control signal 523 with the object 500. When the user input selects the object 500 on the display 150, the electronic device 101 can output at least one of the control signals for controlling the power of the set-top box and the control signal for controlling the power of the TV which are set in the object 500.

The electronic device 101 can associate a control signal with an object by dividing the object (e.g., an object 540) into two or more regions. The electronic device 101 can detect that a user input divides the object 540 of a particular shape (e.g., a quadrangle or an oval) drawn on the display 150 into two or more regions (e.g., an object 541 and an object 542). The electronic device 101 can then associate a different control signal with each of the divided object 541 and the divided object 542. For example, based on the user input, the electronic device 101 can associate the control signal 521 with the divided object 541 and the control signal 523 with the divided object 542. The electronic device 101 can associate the control signal 523 with the object 542 in response to any suitable type of gesture. For example, example the control signal 523 may be associated with the object 524 when an identifier corresponding to the control signal is dragged onto the object 524 when a double-tap is performed on the object (or identifier), and/or a long-press is performed on the object. Further, the electronic device 101 can associate a given control signal with an object based on a method stored in its setting information. Afterwards, when the divided object 541 of the single oval (or polygonal) object 540 is selected, the electronic device 101 can output the control signal associated with the associated divided object (e.g., a power on/off signal for controlling the set-top box). When selecting the divided object 542, the electronic device 101 can output the control signal for controlling the power of the TV.

The electronic device 101 can store the object 500 including the control signal 521 based on a user input. The electronic device 101 can store the object 500 in the object list including objects of at least one control signal, or in a separate database. When detecting that an object is drawn on the display 150, the electronic device 101 can substitute the drawn object with the object 500, and display the object 500 including the control signal 521 on the display 150.

Figure 5B:
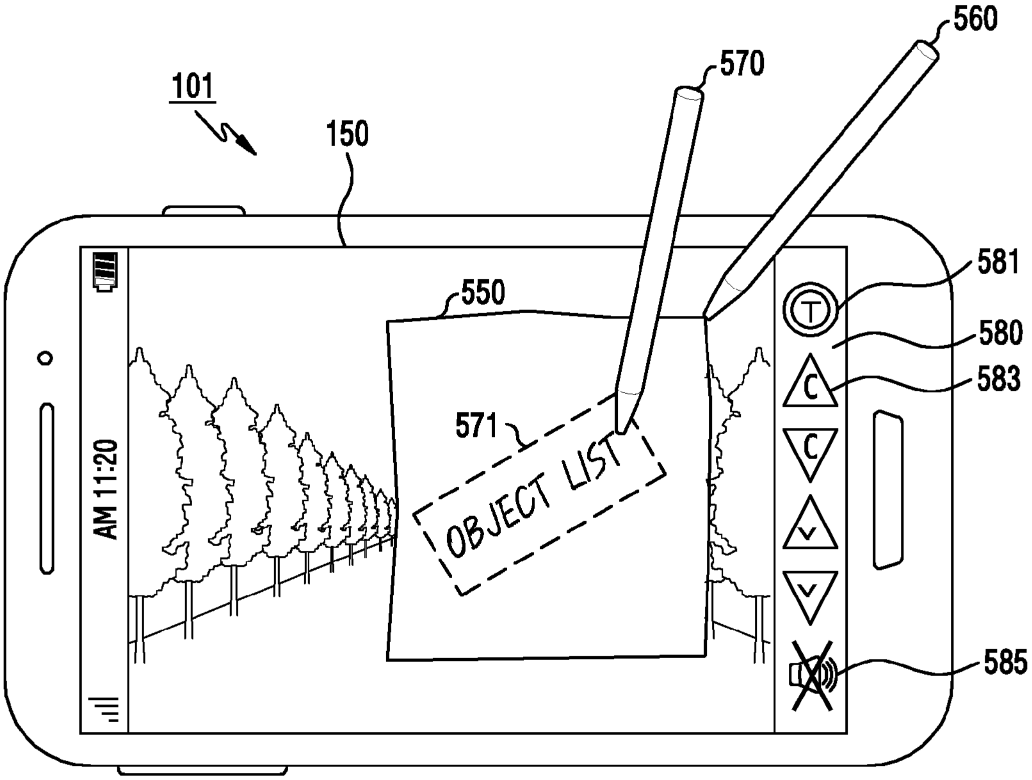
FIG. 5B is a diagram of an example of a user interface, according to an embodiment of the present disclosure.

FIG. 5B is a diagram of an example of a user interface, according to various embodiments of the disclosure. According to this example, the electronic device 101 can display an object for controlling at least one other electronic device on the display 150 based on a user input. The electronic device 101 can generate an object 550 in another part of the display 150 based on a user input. The object can serve as a button for executing a particular function. For example, the object 550 generated on the display 150 of the electronic device 101 can include another object, for example, the circular object 500 or the oval (or polygonal) object 540. The object 550 generated on the display 150 of the electronic device 101 is not limited to an oval or polygonal shape, and may have any other suitable type of shape, including a closed curve. The electronic device 101 can display the object 550 on the display 150 based on a user input, for example, which selects a graphical interface to invoke the object 550 among graphical interfaces on the display 150 or selects a particular button of the electronic device 101. To generate and display the object 550 drawn on the display 150 based on the user input, the electronic device 101 can display the object in the user interface of a program that is being executed, such as a memo program, allowing the object creation. The object 550 can be displayed in response to a user input drawing the shape of the object on the display 150 during the execution of the memo program, and/or various other programs, such as a media player and/or an Internet browser.

The electronic device 101 can execute at least one function through the object 550 drawn in a certain region of the display 150 with the user input. When a user input 570 inputs a text "object list" 571 to the object 550, the electronic device 101 can display an object list 580 corresponding to the input text "object list" 571. When the object 550 is selected, the electronic device 101 may execute a particular function (e.g., the remote control function) preset as a default function for the object. In some implementations, the object list 580 can include a collection of objects associated with different remote control buttons. The object list can include a collection of objects including a control signal or a command attribute.

When executing the remote control function in the object 550 (e.g., a first object) on the display 150, the electronic device 101 may display the object list 580 including at least one second object for the remote control function, in at least part of the display 150. The object list 580 on the display 150 of the electronic device 101 can include a second object associated with at least one control signal for the remote control function. The second object may include any suitable type of a graphical interface input component, such as an icon or an image. For example, the object list 580 can display second objects including the control signal for controlling particular electronic devices respectively, such as a power icon 581 for controlling the TV power, a channel icon 583 for controlling a TV channel, and an icon 585 for controlling TV MUTE.

In some implementations, the electronic device 101 may display an attribute list including at least one control signal such as the attribute list 520 of FIG. 5A. The electronic device 101 can display the attribute list in part of the display 150, as the object list 580, on the display 150 of FIG. 5B.

As noted above, the object 550 may be used as a function invoke region for invoking a particular function or information (e.g., the object list or the attribute list) of the electronic device 101 based on the user input detected in the object 550 of the display 150.

The object 550 can be displayed on the display 150. The electronic device 101 can associate an attribute for controlling the other electronic device (e.g., the electronic device 102 and/or the electronic device 103), with the object 550. As noted above, the electronic device 101 can assign a remote control function to the object 550. The electronic device 101 can include at least one other object (e.g., the second object) in the object 550 (e.g., the first object) by invoking the remote control function in the object 550. For example, the electronic device 101 can receive a text string "remote control 1" (not shown) as the user input 570, to the object 550. The remote control 1 can include preset object configuration information for controlling the other electronic device (e.g., the electronic device 102 and/or the electronic device 103). The object configuration information corresponding to "remote control 1" can include at least one second object (e.g., at least one of the object 500 and the object 540 of FIG. 5A and the second objects including the object 581, the object 583, and the object 585 of FIG. 5B) of "remote control 1", and/or include location information (e.g., arrangement information or disposition information) for displaying the included second object in the first object 550. When the remote control function is invoked, the electronic device 101 can display at least one object in the first object 550 based on the corresponding object configuration information. Based on a user input or the configuration information, the electronic device 101 can store (e.g., store in the object configuration information) the object (e.g., the second object) displayed in the first object 550 at a particular time and/or the location information of the second object.

Figure 6:
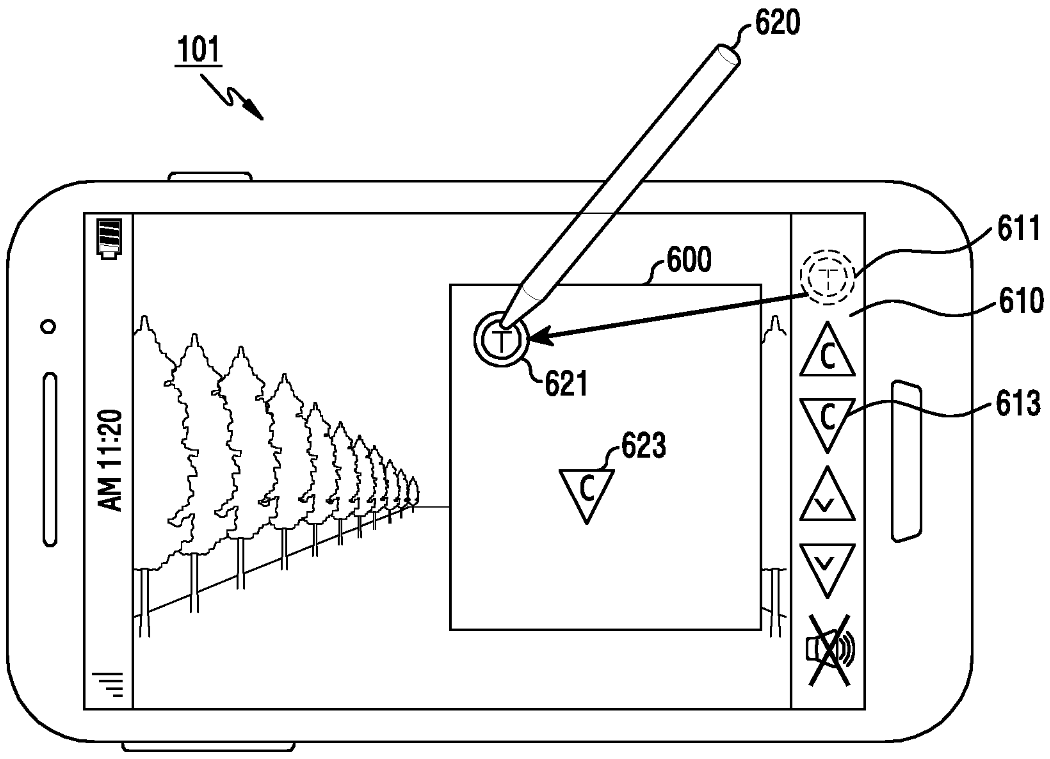
FIG. 6 is a diagram of an example of a user interface, according to an embodiment of the present disclosure.

FIG. 6 is a diagram of an example of a user interface, according to an embodiment of the present disclosure.

The electronic device 101 can set a remote control function in an object 600 (e.g., a first object) on the display 150.

For example, a user can draw a figure on the display 150. When detecting that the figure is drawn on the display 150, the electronic device 101 can display a corresponding object, such as an object 600, in a size corresponding to the drawn figure.

The electronic device 101 can include at least one object (e.g., an object 600 including at least one of an object 611 and an object 613) in an object list 610. For example, with an object 621 and an object 623, based on the user input, the electronic device 101 can invoke the object 600 including the object 621 and the object 623 to a particular object list or invoke the object 600 (e.g., the object 600 including the object 621 and the object 623) to an object list 610.

When generating the first object 600 based on a user input, the electronic device 101 can invoke a remote control function defined in the setting information. The electronic device 101 can associate the remote control function in the first object 600 based on a user input detected in the first object 600. When the remote control function is associated with the first object 600, the electronic device 101 can invoke a second object (e.g., an icon) for controlling at least one function (e.g., including a control signal to control at least one function) of a particular electronic device (e.g., the electronic device 102 and/or the electronic device 103), from the displayed object list 610. The electronic device 101 can invoke a power control icon for controlling the TV power from the object list 610 based on a user input and display the icon in the first object 600 of the display 150. The electronic device 101 can invoke a channel control icon for controlling the TV channel from the object list 610 based on a user input and display the icon in the first object 600 of the display 150. The electronic device 101 can display at least one icon from the object list 610 in the first object 600 when that icon is dragged from the icon list 610 into the first object 600. For example, to drag and display the icon in the first object 600 of the display 150, the electronic device 101 can touch the icon 611 displayed in the object list 610, the electronic device 101 can touch and drag the icon 611 of the object list 610 into the first object 600, release the touch, and thus display the icon 621 (e.g., the icon of the same function as the original icon 611) in the first object 600. The electronic device 101 can touch or multi-touch (e.g., touch two or more times within a preset time) at least one of second objects displayed in the object list 610 based on a user input, and display the selected second object in the first object 600 of the display 150. The electronic device 101 can output a control signal associated with the second object when the second object is selected.

The electronic device 101 can change the size of the first object 600 and/or the second object (e.g., the object 621, the object 623). Based on a user input or input for controlling the object size, the electronic device 101 can modify the size of the selected (e.g., selected from the objects on the display 150) object. For example, the electronic device 101 can detect a user input for reducing the size of the object 600. When the first object 600 includes at least one of the second object 621 and the second object 623, the electronic device 101 can reduce the size of the first object 600 down to a preset value. For example, when determining the preset size, the electronic device 101 can cause the size of the first object 600 to be smaller than the size of the second object (e.g., the object 621 or the object 623). In some implementations, the first object 600 can be resized to the average size of the object 621 and the object 623. Herein, the size unit can include an area. When the size of the first object 600 is reduced to the size below the preset size, the electronic device 101 can set a control signal of the second objects of the first object 600, in the first object 600. The electronic device 101 can confirm the control signal of the object 621 and/or the object 623 of the first object 600. The electronic device 101 can retrieve the control signal for controlling TV power and/or the control signal for changing TV channels. The electronic device 101 can set at least one of the confirmed control signals in the first object 600. When associating the control signal of the second object with the first object, the electronic device 101 can hide the second object (e.g., the object 621 and/or the object 623) from the display 150. When detecting an input for selecting the first object 600, the electronic device 101 can output the control signal defined in the first object 600. For example, when reducing the size of the first object 600, the electronic device 101 can associate the control signal for controlling the TV power of the object 621, directly with the first object 600. When detecting an input for selecting the first object 600, the electronic device 101 can output the power on/off control in the first object 600.

For example, a region including at least one second object such as the object 600 can be defined as a first object. The first object may be used to invoke a preset function of the electronic device 101 based on a user input. The graphical interface such as an image or an icon including the control signal for controlling at least one other electronic device can include an icon, an image, and a second object. The second object can be displayed on the display 150 independently, or included in the first object.

When detecting a user input for changing the location of the object 600 on the display 150, the electronic device 101 can also change the location of at least one other object (e.g., the object 621 and/or the object 623) in the object 600.

Figure 7:
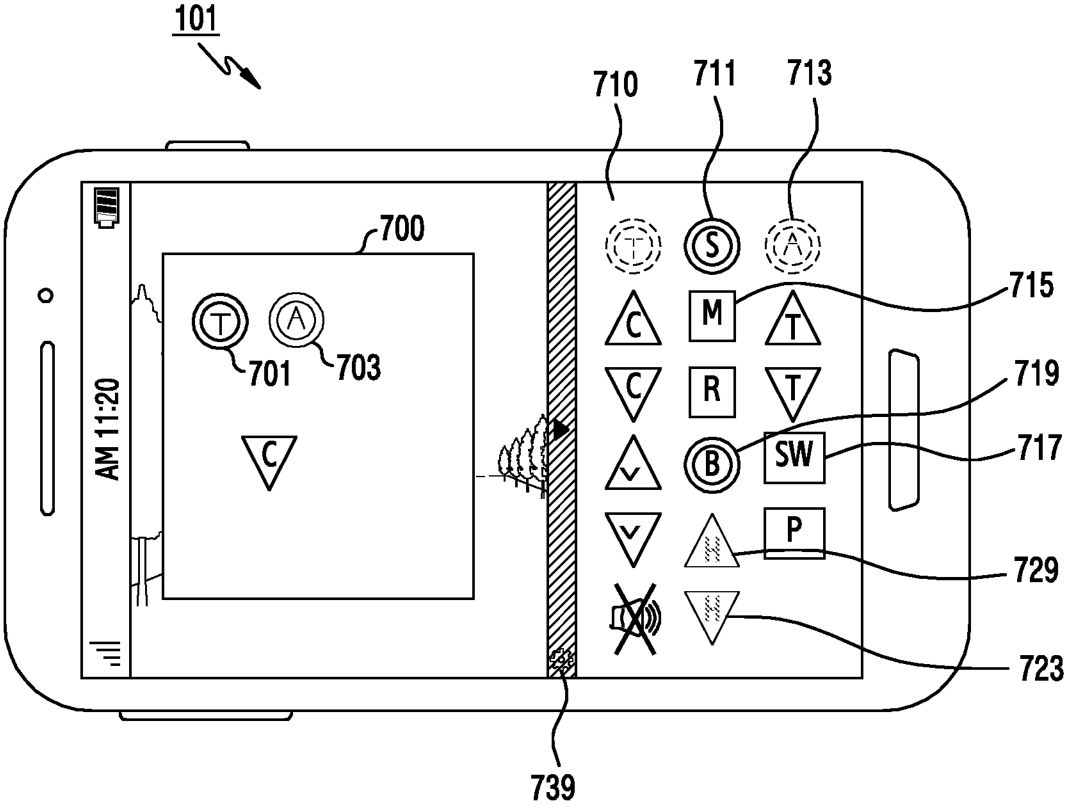
FIG. 7 is a diagram of an example of a user interface, according to an embodiment of the present disclosure.

FIG. 7 is a diagram of an example of a user interface, according to an embodiment of the present disclosure.

The electronic device 101 can include and set a second object for controlling another electronic device, in a first object 700. The first object 700 may be displayed on the display 150. When including the second object in the first object 700, the electronic device 101 can include two or more second objects. To control two or more other electronic devices (e.g., a TV, an air conditioner, and/or a set-top box), the electronic device 101 can display in the first object, an object (e.g., the second object or an icon) for controlling the electronic device 102 and another object for controlling the electronic device 103. When including at least one second object in the first object 700, the electronic device 101 can select the second object from an object list 710, and include the selected object in the first object 700. The second object can include a control command for controlling at least one function of two or more other electronic devices (e.g., the electronic device 102 and/or the electronic device 103). The electronic device 101 can display the second object in the first object 700 and thus include the selected second object in the first object 700. For example, when displaying a power icon 701 in the first object 700, the electronic device 101 can display the first object 700 in a remote control region for controlling the TV. The electronic device 101 can display second objects such as a channel control icon or a volume control icon in the first object 700 which is used for controlling the TV.

When displaying a power icon 703 for controlling an air conditioner in the first object, the electronic device 101 can set the first object 700 as a region for controlling the air conditioner. The electronic device 101 can additionally display and use a temperature control icon and a swing control icon 717 for controlling the air conditioner in the function invoke region. When the TV power icon 701 and/or the air conditioner power icon 703 are displayed in the first object 700 and selected, the electronic device 101 can activate (switch) the remote control function of the selected electronic device.

When a MUTE icon 715 is selected while the TV power icon 701 is activated, the electronic device 101 can mute the TV. The electronic device 101 can display the MUTE icon 715 with a set-top box power icon 711 in the first object 700. When the MUTE icon 715 is selected, the electronic device 101 can also mute the volume of the set-top box. A plurality of control signals can be therefore associated with the MUTE icon 715. The MUTE icon 715 can include a control signal for muting the TV set and a control signal for muting the set-top box. When detecting that the MUTE icon 715 is selected, the electronic device 101 can output the control signal for muting the TV set and the control signal for muting the set-top box. The electronic device 101 can output the control signals based on how the MUTE icon 715 is selected. When the MUTE icon 715 on the display 150 is selected, the electronic device 101 can detect the type of input used to select the MUTE icon 715 (or another type of object), such as single tap, double tap, or press long over a preset time (e.g., one second), and output one of a plurality of preset control signals associated with the icon 715 depending on the type of the input.

The electronic device 101 can modify the object list by selecting a setting icon 739 displayed in the object list 710. When a user input selects the setting icon 739, the electronic device 101 can provide a function for adding and/or deleting the second object to or from the object list (e.g., an object list setting function), or provide a function for adding the remote control function of at least one other electronic device. The electronic device 101 may change an image associated with the second object (e.g., an icon) displayed in the object list through the object list setting function.

When displaying the second object in the object list 701, the electronic device 101 can separately display an electronic device invoked in the first object and an electronic device not invoked. When an icon 719 for turning a boiler on and off is not included in the first object 700, the electronic device 101 can display in the object list 710, an inactive second object (e.g., an object 729 and an object 723) for controlling the boiler. When selecting and displaying the icon 719 in the first object 700, the electronic device 101 can display the activated second object (e.g., the object 729 and the object 723) for controlling the boiler.

Figure 8:
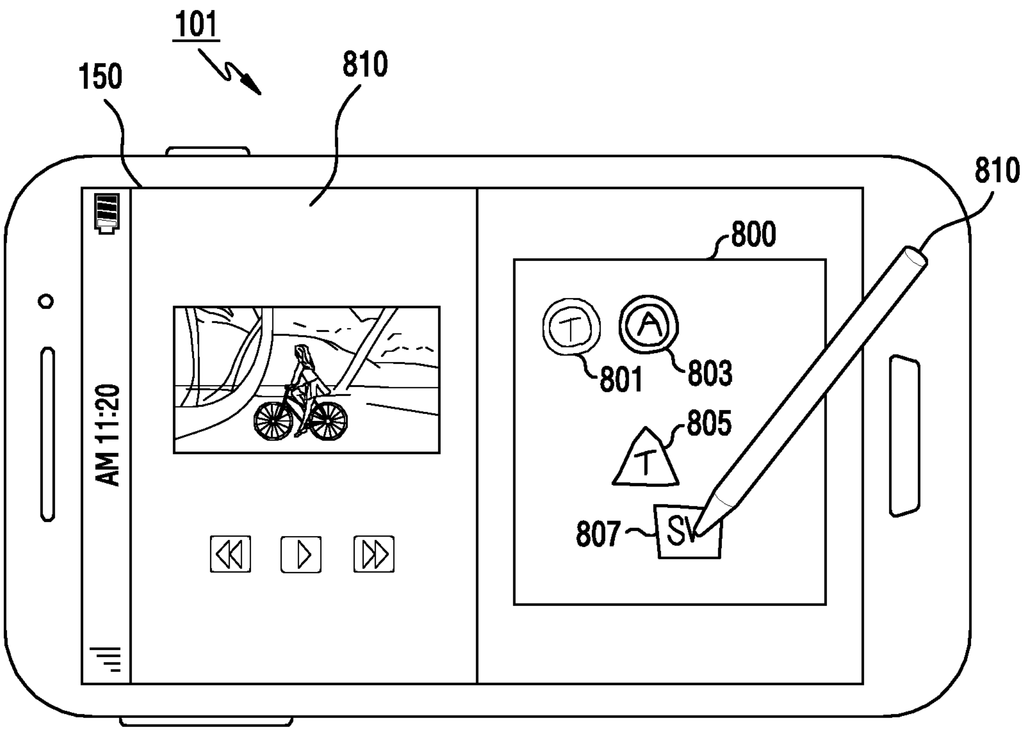
FIG. 8 is a diagram of an example of a user interface, according to an embodiment of the present disclosure.

FIG. 8 is a diagram of an example of a user interface, according to an embodiment of the present disclosure.

The electronic device 101 can display at least one second object in a first object 800 of the display 150. The electronic device 101 can use an image including a control signal of a second object matching an image drawn in the first image 800 of the display 150, as the second object of the remote control function. For example, the electronic device 101 can obtain an image 801 input in the first object 800. The electronic device 101 can compare the drawn image 801 with second objects identified in the object list. The electronic device 101 can identify a second object (e.g., a TV power icon) matching the image 801, and associate a control signal corresponding to the identified second object with the image 801. Afterwards, when the image 801 is selected, the electronic device 101 can output the control signal for controlling the TV power. When a user input selects the image 801, the electronic device 101 may determine the first object 800 as the remote control (e.g., the remote control function) for the TV control.

When an image 803 is selected in the first object 800, the electronic device 101 can associate a remote control function of an air conditioner with the first object 800. The electronic device 101 can display a second object (e.g., a temperature control icon 805) preset by a user input. When displaying the second object for controlling the air conditioner in the first object 800, the electronic device 101 can display an icon selected from the object list or an image, such as an image 807, directly hand-drawn on the device's screen by the user. When determining the drawn image 807 matching a swing control icon, the electronic device 101 can set a control signal of the swing control icon in the image 807. Further, the electronic device 101 may display the swing control icon matching the image 807 in the first object 800. For example, the electronic device 101 can replace the image 807 input to the display 150 with the matching swing control icon (e.g., the second object 717 of FIG. 7).

The electronic device 101 can modify (or change) the image which is input (e.g., drawn) on the display 150. When a hand-drawn figure, for example, the image 805, drawn with an input means (e.g., a finger) on the display 150 is not a closed figure, the electronic device 101 can automatically close it. Additionally or alternatively, when a line segment of the triangle of the image 805 is not straight, the electronic device 101 may automatically straighten it. Herein, the closed figure is not limited to a curved figure such as a circle or an oval, and can include figures including a straight line and an apex such as a triangle and a quadrangle.

The electronic device 101 can display the first object 800 together with the user interface of another application. When detecting a user input for invoking the first object 800 during an ongoing video playback, the electronic device 101 can change the size of a layer 810 displaying the video. The electronic device 101 may display the first object 800 in part of the layer 810 displaying the video, or in a layer 820 separately generated from the layer 810. The electronic device 101 can control the size of at least one of the layers (e.g., the layer 810 and/or the layer 820) based on a user input.

Figure 9:
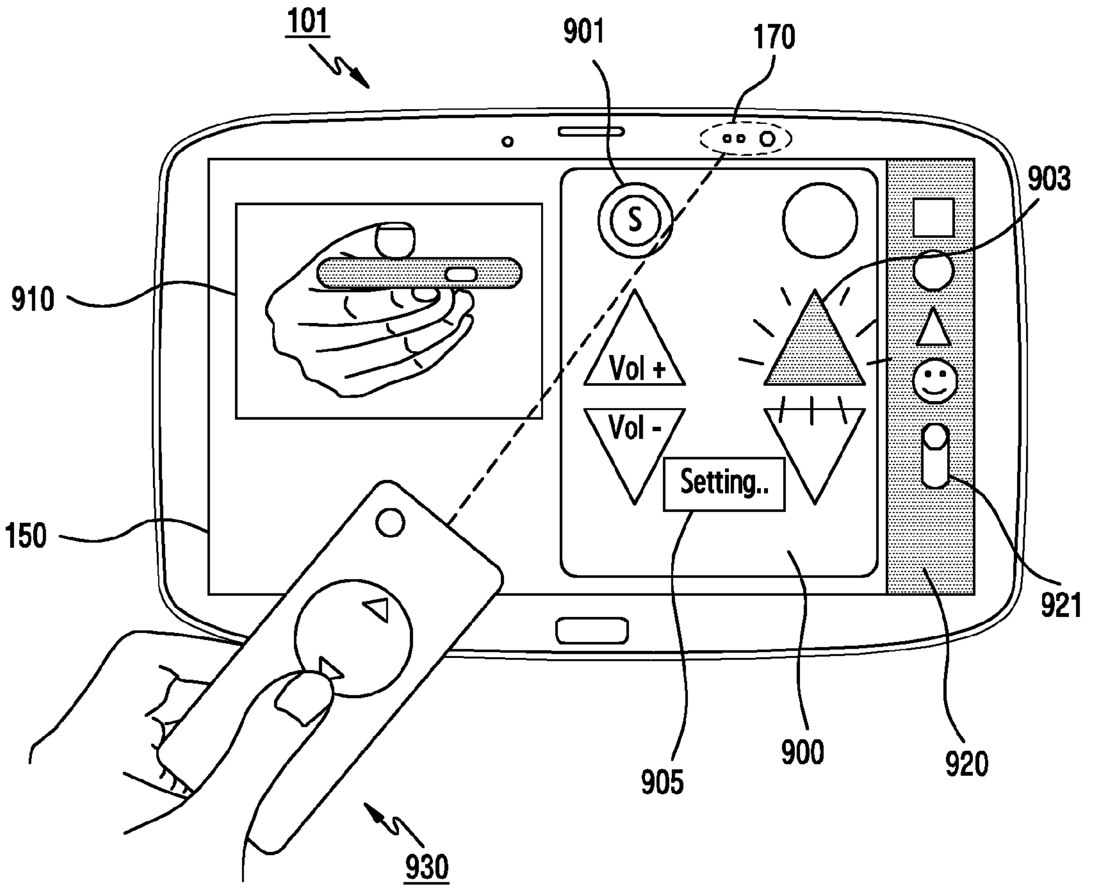
FIG. 9 is a diagram of an example of a user interface, according to an embodiment of the present disclosure.

FIG. 9 is a diagram of an example of a user interface, according to an embodiment of the present disclosure. According to this example, the electronic device 101 can obtain a control signal output from at least one remote control device through the signal receiving sensor 170, and generate a second object for controlling a particular electronic device by including the obtained control signal in that particular object. The electronic device 101 can display at least one second object in a first object 900 presented on the display 150 when the electronic device is in a remote control setting mode, and select a second object 903 to set the remote control function. When displaying the second object for setting the remote control function in the first object 900, the electronic device 101 can display (or provide) an image list 920 including at least one image for the second object, and display a particular object, as the second object, in the first object 900 using a figure of the image list 920 or an image such as a moving icon 921. In some implementations, the electronic device 101 can receive a control signal from a remote control device 930 via the signal receiving sensor 170. The signal receiving sensor 170 of the electronic device 101 can include a camera or an IR transceiving sensor. When receiving the control signal from the remote control device 930 via the IR transceiving sensor, the electronic device 101 can display an image of the remote control device 930 in part 910 of the display 150. The image may be captured with the camera. The electronic device 101 can analyze a shape of the remote control device captured by the camera, identify a direction in which the remote control device is pointed, and output a guide (e.g., display a guide line) indicating the direction in which the remote control device should be oriented in order for it to be able to communicate with the IR transceiving sensor. The electronic device 101 can obtain the control signal output from the remote control device 930 through the IR transceiving sensor. For example, the electronic device 101 can obtain the control signal output from the remote control device 930. The electronic device 101 can detect the control signal through the IR transceiving sensor.

The electronic device 101 can store the control signal acquired through the IR transceiving sensor, in an attribute list stored in its memory 130. The electronic device 101 can generate an object including at least one of a plurality of control signals stored in the attribute list. When generating the object, the electronic device 101 can select at least one control signal and an image (e.g., an icon) to be displayed on the display 150 and associate the control signal with the selected image. The electronic device 101 can then store the generated object in the object list. Afterwards, the electronic device 101 can use the object stored in the object list, as the first object and/or the second object.

The electronic device 101 can associate the obtained control signal with the second object 903 for the remote control function. When associating the remote control function with at least one second object (e.g., the second object 903) displayed in the first object, the electronic device 101 can display a setting notification 905.

To associate a second object for controlling the set-top box with the first object 900, the electronic device 101 can select a power icon 901 of the set-top box in a function setting region and invoke the TV remote control function to the first object 900. The electronic device 101 can then display a particular image 903 in the first object 900 through an image list 920, and input a control signal by selecting the image 903. The electronic device 101 can receive a control signal from the remote control device 930 and display the image of the remote control device 930 captured through the camera in a camera region 910 of the display 150. The electronic device 101 can then display a guide indicating the direction in which the remote control device should be oriented. The electronic device 101 can set the obtained control signal in the image 903. When the control signal output from the remote control device 930 is associated with a channel-up function and user input is received that selects the image 903, the electronic device 101 can output a channel-up control signal.

FIG. 10A is a diagram of an example of a setting table, according to an embodiment of the present disclosure.

The electronic device 101 can include an object for outputting a particular control signal, into a setting table 1000. When including the object in the setting table 1000, the electronic device 101 can obtain and store in the setting table 1000 an image and/or a control signal associated with the object. When including various objects in the setting table 1000, the electronic device 101 can set the remote control function by directly inputting a control signal from the remote control in the remote control setting mode, or receive and set a function list of a particular remote control device from another electronic device (e.g., the server 106) connected to the electronic device 101 through network communication.

The electronic device 101 can include at least one of an object image column 1013, a category column 1015 of the remote control function corresponding to the object, and control information (e.g., first control information column 1017, second control information column 1019, and third control information column 1021). In some implementations, when an object for controlling an electronic device (e.g., the electronic device 102 and/or the electronic device 103) is displayed in a first object on the display 150, the control information can be classified based on the object selection style. For example, the first control information column 1017 can be associated with a single tap input gesture, the second control information 1019 column can be associated with a long press (e.g., pressing over one second) input gesture, and the third control information column 1021 can be associated with a double tap input gesture.

For example, when the user taps on an icon of the object 1031, the electronic device 101 can output a control signal for controlling the TV power and a control signal for controlling the set-top box power according to information stored in the first control information 1017. When the user performs a long touch (on the icon of the object 1031 number 1011, the electronic device 101 can output a control signal for controlling the TV power. When the user performs a double-tap on the icon of the object 1031, the electronic device 101 can output a control signal for controlling the set-top box power.

The electronic device 101 may merge an object including at least one control signal into the setting table 1000, or set an object in a dependent setting table.

Figure 10B:
FIG. 10B is a diagram of an example of a setting table, according to an embodiment of the present disclosure.
Figure 10B:
Figure 10B:
Figure 10B:
Figure 10B:
Figure 10B:

FIG. 10B is a diagram of an example of a setting table, according to an embodiment of the disclosure.

The electronic device 101 is not limited to those explanations, and can set the control signal so as to control two or more functions such as first control information column 1053 and/or second control information column 1055 in an icon of an object 1061. When a control signal for increasing speaker volume is associated with the first control signal column 1053 of the icon of the object 1061 and a control signal for increasing a volume of the set-top box is set in the second control information column 1055, the electronic device 101 can increase the speaker volume and/or the set-top box volume using the icon of the object 1061. For example, when the user taps the icon of the object 1061, the electronic device 101 can output a volume up control signal. When detecting another input for selecting the icon of the object 1061, the electronic device 101 can determine whether a preset time has passed from the previous selection of the icon of the object 1061. When the preset time has passed, the electronic device 101 can output the volume-up control signal corresponding to the speaker. When the preset time has not passed, the electronic device 101 can output the volume-up control signal corresponding to the set-top box.

When detecting a user input repeatedly selecting the icon of the object 1061, the electronic device 101 can alternately output the volume up control signal of the speaker of the first control information column 1053 and the volume up control signal of the set-top box of the second control information column 1055 according to the number of the selection times of the icon of the object 1061. As stated earlier, the electronic device 101 can output the preset control signal according to the selection type of the second object based on the setting information. The electronic device 101 can be configured to select the second object in various manners and to control two or more electronic devices (e.g., a TV, an air conditioner, a speaker, and/or a set-top box).

The electronic device 101 is not limited to outputting the preset control signal according to the user input which repeatedly selects the object, and can output the preset control signal based on various input styles stored in the setting information. The electronic device 101 can detect various types of input, such as a single tap, a double tap, a long press (e.g., one second), a particular touch pattern, and/or any other suitable combination thereof. The electronic device 101 can select the preset control information corresponding to the detected touch and/or output at least one of the control signals of the control information.

Figure 11:
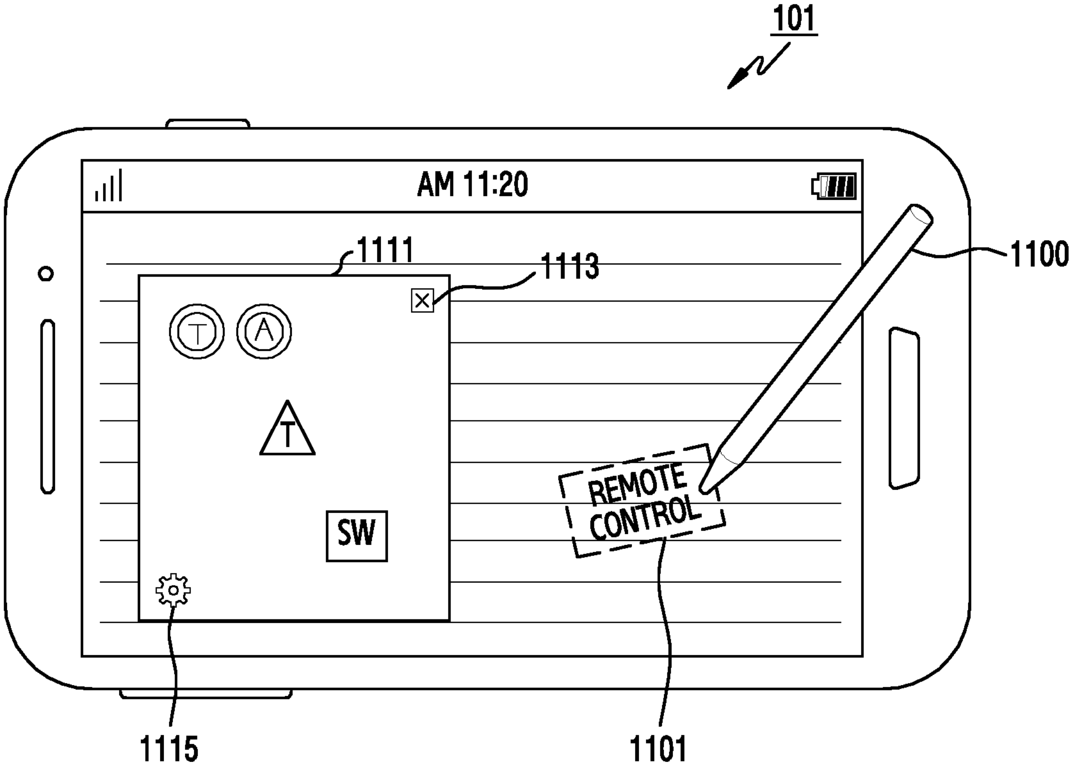
FIG. 11 is a diagram of an example of a user interface, according to an embodiment of the present disclosure.

FIG. 11 is a diagram of an example of a user interface, according to an embodiment of the present disclosure.

The electronic device 101 can invoke (and display) a preset remote control function based on a user input detected on the display 150. When detecting the input of text "remote control" 1101 via an input device 1100, the electronic device 101 can display a first object 1111 corresponding to the text "remote control" 1101 on the display 150. In some implementations, the first object 1111 on the display 150 can include at least one second object corresponding to the text "remote control".

The electronic device 101 can select and move the first object 1111 on the display 150 and thus also move the at least one second object of the first object 1111. When selecting a preset icon 1115 in the first object 1111, the electronic device 101 can provide a function for changing the second object of the first object 1111. When detecting a user input for selecting a close icon 1113, the electronic device 101 can hide the first object 1111 from the display 150.

As noted above, the electronic device 101 can display at least one first object on the display 150 according to a text input to the display 150. The electronic device 101 is not limited to the text "remote control" 1101 input to the display 150. Upon detecting a preset text input such as a text "remote control 1," the electronic device 101 can display at least one first object corresponding to the input text on the display 150. It is noted that, when invoking the first object, the electronic device 101 is not limited to displaying the single first object and may invoke two or more first objects according to the input text. Each of first objects may be associated with a different electronic device that is controllable by the electronic device 101. The input for invoking the first object is not limited to the text input to the display 150, and may include various inputs such as a figure, a symbol, a number, or a particular audio sound input through a microphone.

Notably, the electronic device 101 is not limited to displaying the first object including at least one second object corresponding to a particular text drawn on the display 150, and can invoke the first object in the function invoke region.

Figure 12:
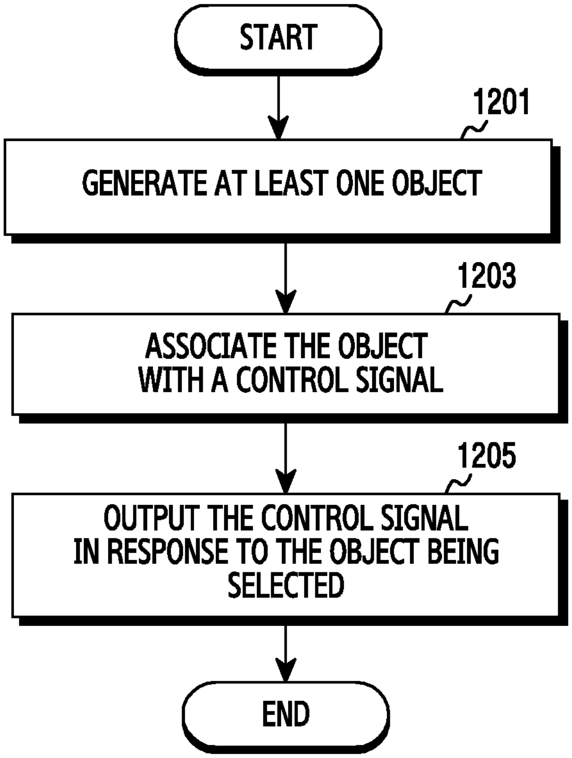
FIG. 12 is a flowchart of an example of a process, according to an embodiment of the present disclosure.

FIG. 12 is a flowchart of an example of a process, according to an embodiment of the present disclosure.

In operation 1201, the electronic device 101 can generate at least one object and present it on the display 150. In some implementations, the object may be generated in response to a user input. When detecting a user input, the electronic device 101 is not limited to displaying a memo program for writing text, a symbol, or a number, on the display 150. The electronic device 101 can detect a user input (e.g., writing) while displaying the user interface of a media player or displaying information such as s web page on the display 150. The electronic device 101 can display the user input (e.g., an image) drawn on the display 150.

In operation 1203, the electronic device 101 can associate a control signal with the object in response to receiving a user input. Based on the object list, the electronic device 101 can determine the object matching the user input (e.g., an image) drawn on the display 150. The electronic device 101 can identify the control signal for controlling a preset function of at least one other electronic device (e.g., a particular electronic device) in the matching object. The electronic device 101 can associate the identified control signal with the image drawn on the display 150.

When setting the control signal in the image drawn on the display 150, the electronic device 101 can set the selected control signal based on a user input. The electronic device 101 can invoke the attribute list including at least one control signal. The electronic device 101 can set the control signal selected from the control signals of the attribute list based on the user input, in the image drawn on the display 150.

The electronic device 101 can set two or more control signals in one image drawn on the display 150 based on the user input or the setting information. The electronic device 101 can use the image including at least one control signal, as the object for controlling a particular electronic device.

In operation 1205, the electronic device 101 can output the control signal of the object in response to the object being selected. When detecting the user input for selecting the object associated with a power-on signal, the electronic device 101 can output the power-on signal. The control signal may be output by using any suitable type of short-range wireless communication protocol, such as an IR communication protocol, Bluetooth, or NFC.

A method for operating an electronic device can include determining at least one object, setting at least one control signal in the object, and outputting the control signal according to the object. The displaying of at least one object on a display can display an image generated based on at least one of tapping, dragging, and drawing input to the display. The control signal can include a preset signal for controlling a function of the other electronic device. The object can include at least two control signals. The outputting of the control signal of the selected object can further include outputting two or more control signals at the same time, outputting at least one of two or more control signals, and outputting two or more control signals in sequence. The object can include two or more second objects including at least one control signal. The outputting of the control signal of the selected object can further include outputting at least one of control signals of the second object of the object.

Figure 13:
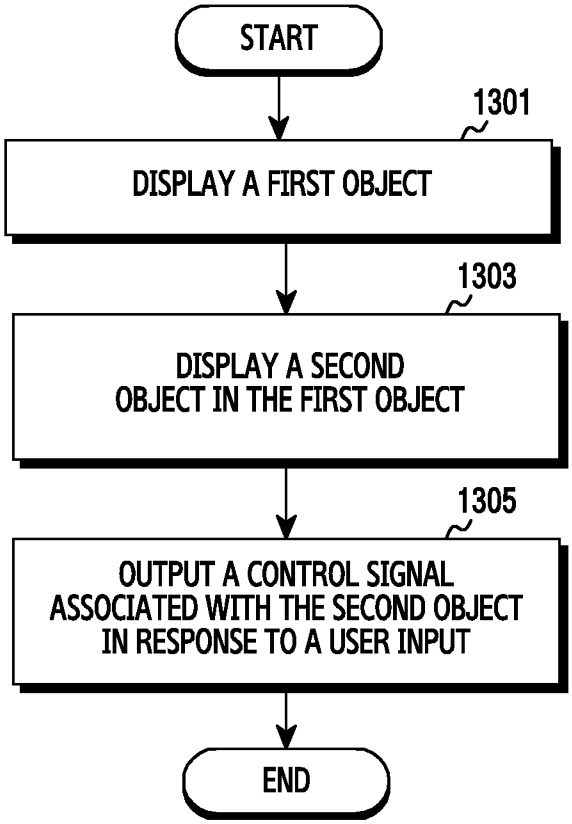
FIG. 13 is a flowchart of an example of a process, according to an embodiment of the present disclosure.

FIG. 13 is a flowchart of an example of a process, according to an embodiment of the present disclosure.

In operation 1301, the electronic device 101 can display a first object on at least part of the display 150. The electronic device 101 can invoke and display the first object concurrently with the user interface of at least one program. For example, when displaying the user interface of a memo program and detecting a closed figure (e.g., a closed curve) drawn over a preset size, the electronic device 101 can recognize the closed figure as the first object. Upon recognizing the first object, the electronic device 101 can invoke the remote control function based on associated setting information.

In operation 1303, the electronic device 101 can display in the first object a second object including control information for controlling at least one other electronic device. To display the second object in the first object, the electronic device 101 can associate the control information of the second object with the first object displayed in at least part of the display 150, in the corresponding image. When confirming the image matching an icon which controls the TV power in the first object based on a user input, the electronic device 101 can set control information of the TV power control icon in the corresponding image or change the corresponding image with the TV power control icon.

According to another embodiment of the present disclosure, to display a second object including control information to control at least one other electronic device in a first object on the display 150, the electronic device 101 can select and display at least one of second objects of the object list displayed in part of the display 150, in the function display region.

In operation 1305, the electronic device 101 can output a control signal associated with the second object in response to a user input. The electronic device 101 can output the control signal using at least one wireless communication protocol, such as an IR communication protocol, Bluetooth, or NFC.

Figure 14:
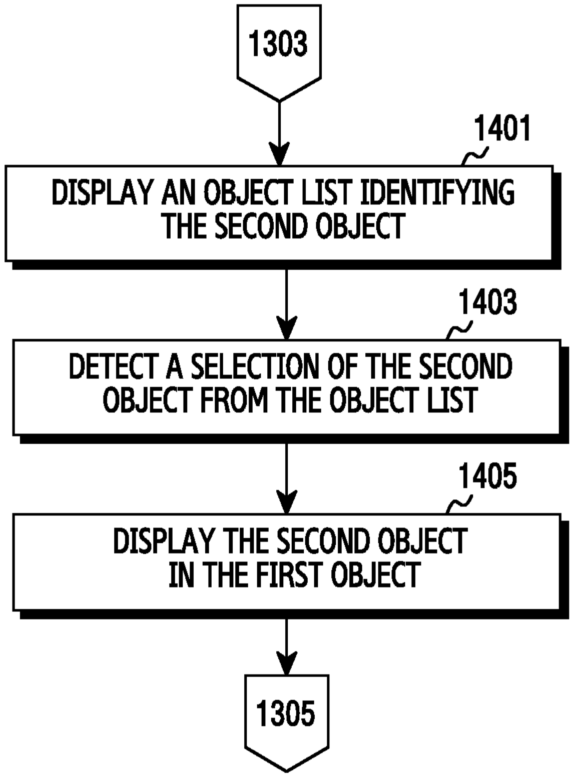
FIG. 14 is a flowchart of an example of a process, according to an embodiment of the present disclosure.

FIG. 14 is a flowchart of an example of a process, according to an embodiment of the present disclosure. In some implementations, the process of FIG. 14 can be performed in place of operation 1303 of the process of FIG. 13.

In operation 1401, the electronic device 101 can display an object list (e.g., a data table) including at least one second object. The second object may include a control command which controls at least one other electronic device.

In operation 1403, the electronic device 101 can detect a selection of the second object from the list. The selection may be made by using any suitable type of input, such as the single tap, the long press, or the double tap, and/or a dragging gesture.

In operation 1405, the electronic device 101 can display the second object in the first object. When the user selects a second object defined as a power icon (e.g., a TV power icon, a set-top box icon, etc.) in the object list, the electronic device 101 can display the selected power icon in the first object and activate the selected remote control function of the first object. When activating a particular remote control function for controlling a particular electronic device (e.g., a TV) in the first object, the electronic device 101 can use the corresponding first object as the TV remote control. Also, the electronic device 101 can display a power control icon associated with another electronic device (e.g., an air conditioner) in the first icon and thus utilize the first object to control two different devices. The electronic device 101 can activate/deactivate the power icon of the particular electronic device displayed in the first object and utilize the power icon as the remote control for controlling the electronic device corresponding to the activated power icon.

Figure 15:
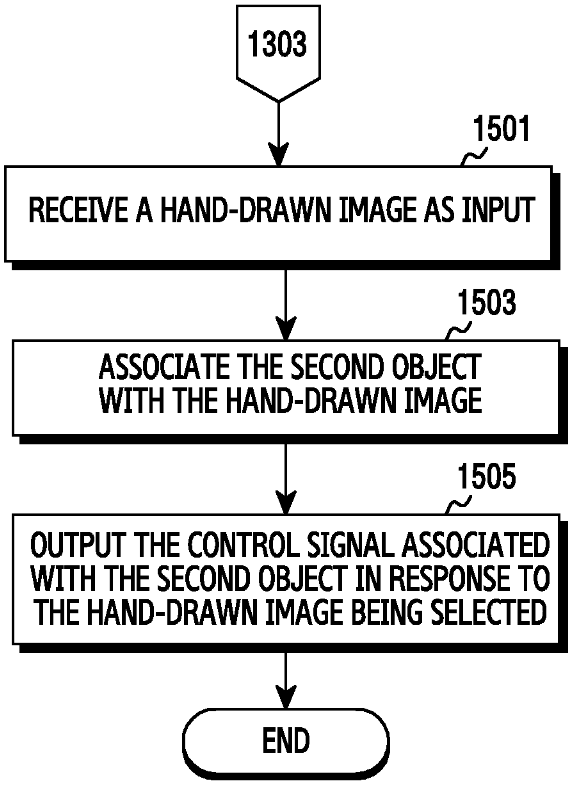
FIG. 15 is a flowchart of an example of a process, according to an embodiment of the present disclosure.

FIG. 15 is a flowchart of an example of a process, according to an embodiment of the present disclosure. In some implementations, the process of FIG. 15 can be performed in place of operation 1305 of the process of FIG. 13.

In operation 1501, the electronic device 101 can receive as input an image drawn (in a first object). The image can be hand-drawn on the display 150 at a location where the first object is displayed. The electronic device 101 can identify a matching second object by comparing the image with at least one image identified in an object list. The electronic device 101 can identify the matching second object in the object list, based on the image drawn in the first object of the display 150 and an image component such as a figure or a text of the second object. The operation 1501 can be performed after the operation 1303 of FIG. 13.

In operation 1503, the electronic device 101 can associate a control signal corresponding to the determined second object with the image drawn in the first object. When identifying the object image matching a TV power icon, the electronic device 101 can set a control signal of the TV power icon in the obtained image and cause the obtained image to execute the same function as the TV power icon.

According to another embodiment of the present disclosure, the electronic device 101 can change the obtained image with the second object matching the image. When determining the object image matching the TV power icon, the electronic device 101 can change the corresponding image with the TV power icon in the first object In operation 1505, the electronic device 101 can receive a user input selecting the image and output the control signal in response to the input. When the user selects the image including the control signal of the TV power icon, the electronic device 101 can output the TV power control signal. The electronic device 101 can output the control signal using any suitable type of short-range communication protocol, such as an IR communication protocol, Bluetooth, and NFC.

According to various embodiments of the present disclosure, the electronic device 101 can include a TV (e.g., the electronic device 102) remote control function. The electronic device 101 can display at least one object for conducting the remote control function of the electronic device 102 on the display 150. The electronic device 101 can display the object on the display 150. The electronic device 101 can select the object on the display 150 based on a user input and output a control signal corresponding to the selected object. When displaying an object for controlling another electronic device on the display 150, the electronic device 101 can select and display at least part of objects of a particular remote control function. The electronic device 101 can also display objects selected from the remote control function corresponding to two or more other electronic devices (e.g., the electronic device 102 and/or the electronic device 103), on the display 150. When displaying an object of at least one remote control function on the display 150, the electronic device 101 can select at least one object from an object list corresponding to the remote control function and add the selected object to the display 150, or draw a preset image in a preset region of the display 150 including the remote control function object and utilize the image as an object for controlling the other electronic device. When a user input selects the image drawn on the display 150, the electronic device 101 can output a preset control signal corresponding to the selected image. For example, the electronic device 101 can display a set-top box power icon, a channel-up icon, and a channel-down icon selected from the object list based on the user input, on the display 150. When selecting the set-top box power icon, the electronic device 101 can output a control signal for controlling the set-top box power. When selecting the channel-up icon or the channel-down icon, the electronic device 101 can output a control signal for controlling a set-top box channel or a channel of another electronic device (e.g., the TV, the electronic device 102).

According to various embodiments of the present disclosure, the electronic device 101 can obtain an image drawn inside an object (e.g., a first object) of the display 150 based on a user input, and determine a matching second object based on an object list of its database. The electronic device 101 can set a control signal corresponding to the determined second object in the corresponding image. For example, when the image drawn in the first object is a temperature-up icon of the electronic device 103 (e.g., an air conditioner), the electronic device 101 can set a control signal corresponding to the temperature-up icon of the electronic device 103 (e.g., the air conditioner) in the image. When a user input selects the image, the electronic device 101 can output a control signal for increasing the temperature of the electronic device 103 (e.g., the air conditioner). As stated earlier, the electronic device 101 can display the second objects for controlling various electronic devices in the first object on the display 150, select at least one of the second objects, output the control signal corresponding to the selected object, and thus control at least one other electronic device (e.g., the electronic device 102 and/or the electronic device 103).

A method for operating an electronic device can include determining at least one object, setting at least one control signal in the object, and outputting the control signal according to the object.

The object can indicate at least one other electronic device.

The control signal can include a preset signal for controlling a function of the other electronic device.

The outputting of the control signal can include at least one of outputting a plurality of control signals at the same time, outputting at least one of a plurality of control signals, and outputting a plurality of control signals in sequence.

The object can indicate a plurality of other electronic devices, and the outputting of the control signal can include outputting the control signal according to the other electronic devices.

The outputting of the control signal can include displaying the object, detecting object selection, determining the control signal according to the object, and outputting the control signal.

The control signal can activate or deactivate the object.

The control signal can be formatted according to the other electronic device.

The determining of the object can include detecting an object generated by a user input.

The determining can include displaying a plurality of objects and detecting selection on at least one of the objects.

Various embodiments of the electronic device 101 can be conducted under control of the processor 12. The electronic device 101 can include a separate module from the processor 120, which is programmed to control various embodiments of the present disclosure. The separate module programmed to control various embodiments of the present disclosure may operate under control of the processor 120.

An electronic device can include a communication module and a processor functionally connected to the communication module.

The processor can be configured to determine at least one object, to set at least one control signal in the object, and to output the control signal according to the object.

The object can indicate at least one other electronic device.

The control signal can include a preset signal for controlling a function of the other electronic device.

The processor can be configured to perform at least one of outputting a plurality of control signals at the same time, outputting at least one of a plurality of control signals, and outputting a plurality of control signals in sequence.

The object can indicate a plurality of other electronic devices, and the processor can be configured to output the control signal according to the other electronic devices.

The electronic device can further include a display functionally connected to the processor. The processor can be configured to display the object, to detect object selection, to determine the control signal according to the object, and to output the control signal.

The control signal can activate or deactivate the object.

The control signal can be formatted according to the other electronic device.

The processor can be configured to detect and determine an object generated by a user input.

The electronic device can further include a display functionally connected to the processor. The processor can be configured to display a plurality of objects and to detect and determine selection on at least one of the objects.

The aforementioned components of the electronic device may include one or more parts, and the name of the corresponding component may differ according to the type of the electronic device. The electronic device of the present disclosure may include at least one of the components, omit some components, or further include other components. Some of the electronic device components may be combined into a single entity to carry out the same functions of the corresponding components.

At least part of the device or the method described in the appended claims and/or the specifications of the present disclosure may be implemented using, for example, hardware, software, firmware or a combination (e.g., a module or a unit) of one or more of them. The term “module” may be interchangeably used with the terms, for example, “unit,” “logic,” “logical block,” “component,” or “circuit.” The “module” may be a minimum unit or part of the components integrally formed. The “module” may be a minimum unit or part of one or more functions. The “module” may be implemented mechanically or electronically. For example, the “module” may include at least one of an Application-Specific Integrated Circuit (ASIC), a Field-Programmable Gate Array (FPGA), or a programmable-logic device for performing operations which are well known or will be developed. The “module” may be provided in a non-transitory computer-readable storage medium storing one or more programs (or programming modules, applications). For example, the programs may be implemented using instructions stored in computer-readable storage media as the programming module. One or more programs may include instructions for the electronic device to carry out the methods described in the appended claims and/or the specifications of the present disclosure. For example, when an instruction is executed by one or more processors (e.g., the processor 120), the one or more processors perform the corresponding function. The non-transitory computer-readable storage medium may be, for example, the memory 130. At least part of the programming module may be implemented (e.g., executed) by the processor 120. At least part of the programming module may include, for example, a module, a program, a routine, sets of instructions, or a process for performing one or more functions.

An electronic device can include a computer-readable storage medium which stores a program for determining at least one object, setting at least one control signal in the object, and outputting the control signal according to the object.

The non-transitory computer-readable recording medium may include magnetic media such as a hard disk, a floppy disk and a magnetic tape, an optical media such as a Compact Disc ROM (CD-ROM) and a Digital Versatile Disc (DVD), magneto-optical media such as a floptical disk, hardware devices specifically configured to store and execute an application instruction (e.g., the programming module) such as an ROM, a Random Access Memory (RAM), and a flash memory, an Electrically Erasable Programmable ROM (EEPROM), a magnetic disc storage device or other optical storage devices, and a magnetic cassette. Alternatively, the programs may be stored in a memory combining part or all of those recording media. A plurality of memories may be equipped. A program instruction may include not only the machine code made by a compiler but also the high-level language code executable by a computer using an interpreter.

The program may be stored in an attachable storage device of the electronic device accessible via the communication network such as Internet, Intranet, Local Area Network (LAN), Wide LAN (WLAN), or Storage Area Network (SAN), or a communication network combining the networks. The storage device may access the electronic device through an external port. A separate storage device in the communication network may access the portable electronic device. The above-stated electronic device may serve as one or more software modules for fulfilling the operations of an embodiment of the present disclosure, and vice versa.

The module or the programming module according to various embodiments of the present disclosure may include at least one of the aforementioned components, omit some components, or further include other components. The operations fulfilled by the modules, the programming modules or other components may be carried out in sequence, in parallel, repeatedly, or heuristically. In addition, some operations may be executed in a different order or omitted, or other operations can be added.

FIGS. 1-15 are provided as an example only. At least some of the operations discussed with respect to these figures can be performed concurrently, performed in different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. An electronic device comprising:

a display;

a communication module; and at least one processor, operatively coupled to the communication module, the at least one processor configured to:

display on the display a menu including a first region and a second region, the first region including a plurality of selectable control signals available for assignment, and the second region defining an area allowing user generation of objects, in response to detecting a first user input generating an object in the second region, display the object in the second region, in response to detecting a drag gesture moving a particular control signal from the first region to the second region, associate the generated object with the particular control signal, and after the association, in response to detecting selection of the generated object, transmit the particular control signal by the communication module to at least one external device.

2. The electronic device of claim 1, wherein the displayed object indicates at least one external device associated with the displayed object, and wherein the displayed object is hand-drawn via the first user input.

3. The electronic device of claim 2, wherein the control signal is generated based on a signal received from a remote control device.

4. The electronic device of claim 1, where the at least one processor is further configured to:

after the association, detect a second drag gesture moving a second particular control signal from the first region to the second region, and associate the generated object with the second particular control signal, and divide the generated object into a first region associated with the particular control signal, and a second region associated with the second particular control signal.

5. The electronic device of claim 1, wherein the at least one processor is further configured to detect a remote control event during execution of an application, and control the display to display another object based on the first user input while displaying at least a portion of an application screen associated with the execution of the application.

6. The electronic device of claim 1, wherein the at least one processor is further configured to:

in response to detecting a remote control event, control the display to display a remote control area on at least a portion of the display while displaying at least a portion of an application screen associated with an execution of an application.

7. The electronic device of claim 1, wherein the at least one processor is further configured to:

in response to detecting a second user input for a first object, activate or deactivate the first object.

8. The electronic device of claim 1, wherein the generated object is displayed on a remote control area based on the first user input.

9. The electronic device of claim 1, wherein the at least one processor is further configured to control the display to display a list comprising a plurality of objects, and detect the first user input for the generated object among the plurality of objects of the list, wherein, in response to detecting the first user input for the generated object, the generated object is displayed on a remote control area.

10. The electronic device of claim 1, wherein the at least one processor is further configured to detect a third user input for a second object while the first object is activated, and in response to detecting the third user input for the second object, output, to a first external device associated with the control signal corresponding to the first object, the control signal corresponding to the second object.

11. An electronic device comprising:

a display;

a memory;

a communication module; and at least one processor, operatively coupled to the communication module, the at least one processor configured to:

detect a first user input on at least a portion of an application screen while displaying the application screen associated with an execution of the application;

control the display to display at least one object drawn by a first user input while displaying the application screen associated with execution of the application;

associate each of the displayed at least one object with at least one control signal for controlling at least one external device among a plurality of control signals stored in the memory;

determine whether a second user input on one of the displayed at least one object is detected; and in response to detecting the second user input, transmit, to the at least one external device, the at least one control signal associated with the displayed at least one object while displaying the application screen associated with an execution of the application.

12. The electronic device of claim 11, wherein the displayed at least one object indicates at least one external device associated with the displayed at least one object.

13. The electronic device of claim 12, wherein the control signal is generated based on a signal received from a remote control device.

14. The electronic device of claim 11, wherein the processor is further configured to:

control the display to display, based on the displayed at least one object, a menu including at least one item indicating the at least one control signal, wherein the menu is displayed on a first region, and in response to detecting a drag gesture moving one of the at least one item from the first region to a second region which displays the at least one object, associate the displayed at least one object with at least one control signal corresponding to the at least one item.

15. The electronic device of claim 11, wherein the at least one processor is further configured to detect a remote control event during an execution of an application.

16. The electronic device of claim 11, wherein the at least one processor is further configured to:

in response to detecting a remote control event, control the display to display a remote control area on at least a portion of screen while displaying the application screen associated with an execution of an application, wherein the displayed at least one object is displayed on the remote control area based on the first user input.

17. The electronic device of claim 11, wherein the at least one processor is further configured to:

in response to detecting the second user input, activate or deactivate the displayed at least one object based on the second user input.

18. The electronic device of claim 11, wherein the at least one processor is further configured to control the display to display a menu including a plurality of items indicating a plurality of control signals for controlling at least one external device, and associate the displayed at least one object with a control signal corresponding to one of the plurality of items when the one of the plurality of items is dragged onto the displayed at least one object.

19. The electronic device of claim 11, wherein the at least one processor is further configured to control the display to display a menu comprising a plurality of items, and detect a third user input for at least one item among the plurality of items, wherein, in response to detecting the third user input for the at least one item, the at least one item is displayed on a remote control area.

20. The electronic device of claim 11, wherein the at least one processor is further configured to detect a fourth user input for another one of the displayed at least one object while a selected object is activated, and in response to detecting the fourth user input for the selected object, output, to a first external device associated with the control signal corresponding to the selected object, the control signal corresponding to the another one of the displayed at least one object.

* * * * *